(12) United States Patent
Ozawa et al.

(10) Patent No.: US 7,009,669 B2
(45) Date of Patent: Mar. 7, 2006

(54) TRANSFLECTIVE LIQUID CRYSTAL DEVICE WITH PARTICULAR THICKNESS ADJUSTING LAYER STACKING AND LIGHT SHIELD AND ELECTRONIC DEVICE USING THE SAME

(75) Inventors: Kinya Ozawa, Suwa (JP); Tsuyoshi Maeda, Suwa (JP); Nobutaka Urano, Suwa (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/775,893

(22) Filed: Feb. 10, 2004

(65) Prior Publication Data

US 2004/0160554 A1 Aug. 19, 2004

Related U.S. Application Data

(62) Division of application No. 10/255,145, filed on Sep. 25, 2002.

(30) Foreign Application Priority Data

| Sep. 25, 2001 | (JP) | ............................. 2001-292644 |
| Jan. 11, 2002 | (JP) | ............................. 2002-005250 |
| Aug. 5, 2002 | (JP) | ............................. 2002-227828 |

(51) Int. Cl.
*G02F 1/1335* (2006.01)
(52) U.S. Cl. ..................................................... 349/114
(58) Field of Classification Search ................ 349/113, 349/114
See application file for complete search history.

(56) References Cited

U.S. PATENT DOCUMENTS

| 6,195,140 B1 * | 2/2001 | Kubo et al. .................... 349/44 |
| 6,281,952 B1 * | 8/2001 | Okamoto et al. .............. 349/12 |
| 6,532,045 B1 * | 3/2003 | Chung et al. .................. 349/43 |
| 6,542,209 B1 * | 4/2003 | Kim et al. .................... 349/106 |
| 6,563,554 B1 * | 5/2003 | Okamoto et al. .............. 349/12 |
| 6,570,634 B1 * | 5/2003 | Kim ............................ 349/107 |
| 6,580,480 B1 * | 6/2003 | Baek et al. ................... 349/114 |
| 6,614,496 B1 * | 9/2003 | Song et al. ................... 349/114 |
| 6,657,689 B1 * | 12/2003 | Baek ........................... 349/114 |
| 6,710,827 B1 * | 3/2004 | Kubo et al. ................... 349/55 |
| 2001/0046014 A1 * | 11/2001 | Ohtake et al. ............... 349/114 |

(Continued)

FOREIGN PATENT DOCUMENTS

CN 1410811 4/2003

(Continued)

OTHER PUBLICATIONS

Communication from Chinese Patent Office regarding counterpart application.

(Continued)

*Primary Examiner*—Frank G. Font
*Assistant Examiner*—Timothy L. Rude
(74) *Attorney, Agent, or Firm*—Harness, Dickey & Pierce, P.L.C.

(57) ABSTRACT

A liquid crystal device includes a transparent first substrate with a first transparent electrode formed on the surface thereof, a transparent second substrate with a second transparent electrode is formed thereon, and a liquid crystal layer. A light reflecting layer defining the reflective display region and the transmissive display region is formed on each pixel region. A layer-thickness adjusting layer where a region corresponding to the transmissive display region constitutes an opening, is formed on the upper layer side of the light reflecting layer. In the layer-thickness adjusting layer, the boundary portion of the reflective display region and the transmissive display region constitutes an inclined surface, and a light shielding film is two-dimensionally superimposed on this boundary region.

14 Claims, 17 Drawing Sheets

U.S. PATENT DOCUMENTS

| | | |
|---|---|---|
| 2002/0033918 A1 * | 3/2002 | Shigeno et al. ............. 349/114 |
| 2002/0118323 A1 * | 8/2002 | Itou et al. ................... 349/113 |
| 2003/0076463 A1 | 4/2003 | Ozawa et al. |
| 2003/0076464 A1 | 4/2003 | Ozawa et al. |

FOREIGN PATENT DOCUMENTS

| | | |
|---|---|---|
| JP | 11-101992 | 4/1999 |
| JP | 11-242226 | 9/1999 |
| JP | 11-316382 | 11/1999 |
| JP | 2000-180881 | 6/2000 |
| JP | 2000-187210 | 7/2000 |
| JP | 2000-267081 | 9/2000 |
| JP | 2000-275660 | 10/2000 |
| JP | 2000-305099 | 11/2000 |
| JP | 2000-305110 | 11/2000 |
| JP | 2003-172923 | 6/2003 |
| JP | 2003-262852 | 9/2003 |
| JP | 2003-270628 | 9/2003 |
| JP | 2003-270727 | 9/2003 |

OTHER PUBLICATIONS

Communication from Japanese Patent Office regarding related application.

* cited by examiner

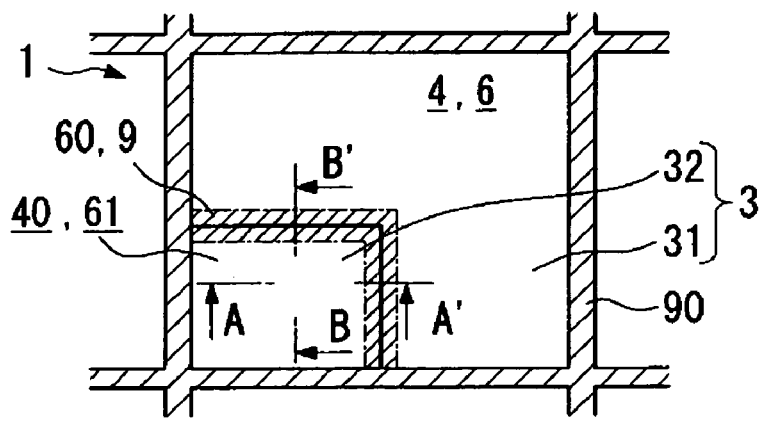
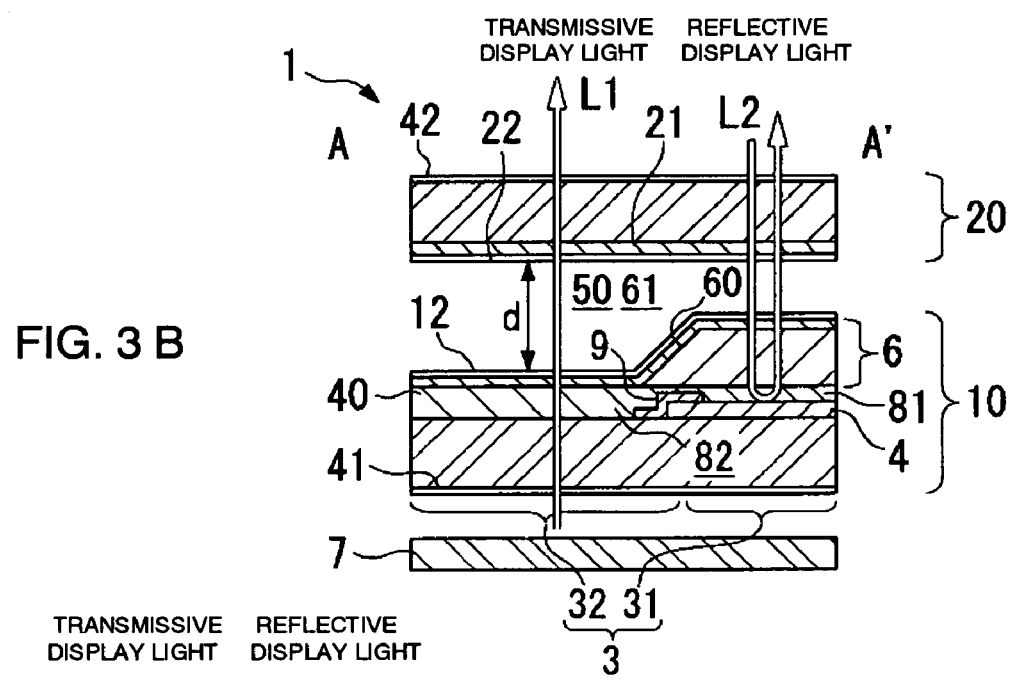
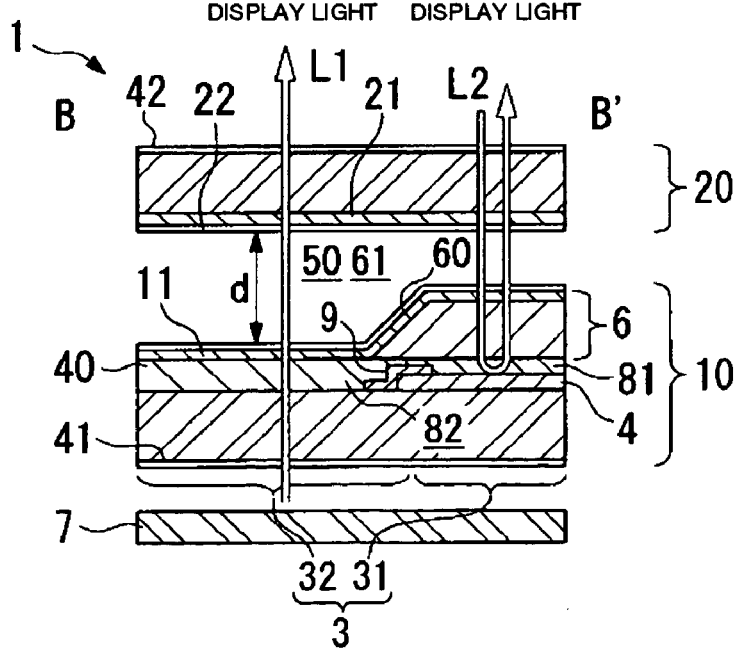

TRANSFLECTIVE LIQUID CRYSTAL DEVICE WITH PARTICULAR THICKNESS ADJUSTING LAYER STACKING AND LIGHT SHIELD AND ELECTRONIC DEVICE USING THE SAME

CROSS-REFERENCE TO RELATED APPLICATIONS

This application is a divisional of U.S. patent application Ser. No. 10/255,145 filed Sep. 25, 2002 which claims priority to Japanese Patent Application Nos. 2002-227,828, filed Aug. 5, 2002, 2002-005250 filed Jan. 11, 2002 and 2001-292-644 filed Sep. 25, 2001. The above applications are hereby incorporated by reference herein in their entireties.

BACKGROUND OF THE INVENTION

1. Technical Field of the Invention

The present invention relates to a transflective liquid crystal device. More particularly, the present invention relates to a multi-gap type liquid crystal device in which the layer thickness of a liquid crystal layer between a transmissive display region and a reflective display region within a single pixel, has been changed into an appropriate value.

2. Description of the Related Art

Among a variety of liquid crystal devices, ones that are capable of displaying images both in a transmissive mode and in a reflective mode are referred to as "transflective liquid crystal devices", and are used in all scenes.

As shown in FIGS. 21A to 21C, the transflective liquid crystal device comprises a transparent first substrate 10 with first transparent electrodes 11 formed on the surface thereof, a transparent second substrate 20 with second transparent electrodes 21 formed on its surface side opposed to the first electrodes 11, and a TN (Twisted Nematic) mode liquid crystal layer 5 held between the first substrate 10 and the second substrate 20. On the first substrate 10, light reflecting layers 4 each constituting a reflective display region 31 is formed in one of pixel regions 3 where the first transparent electrodes 11 and the second transparent electrodes 21 are opposed. The remaining regions where the light reflecting layers 4 are not formed, each constitutes a transmissive display region 32. Polarizers 41 and 42 are disposed on the outer surfaces of the first and second substrates 10 and 20, respectively. A backlight device 7 is opposed to the polarizer 41 side.

In the liquid crystal device 1 with this arrangement, out of light emitted from the backlight device 7, the light made incident on the transmissive display region 32 enters the liquid crystal layer 5 from the first substrate 10 side, as indicated by the arrow L1. After having been subjected to an optical modulation at the liquid crystal layer 5, the light is emitted from the second substrate 20 side as transparent display light, thereby displaying an image (transmissive mode).

Also, out of external light made incident from the second substrate 20 side, the light entering the reflective display region 31 reaches the reflective layer 4 through the liquid crystal layer 5, as indicated by the arrow 2. After having been reflected from the reflective layer 4, the light again passes through the liquid crystal layer 5, and is emitted from the second substrate 20 side as a reflective display light, thereby displaying an image (reflective mode).

On the first substrate 10, a reflective display color filter 81 and a transmissive display color filter 82 are formed in each of the reflective display regions 31 and each of the transmissive regions 32, respectively, thereby allowing color display.

When performing such an optical modulation, if the twisted angle of a liquid crystal is set to be small, the change in a polarization condition becomes a function of the product of a difference in the refractive index $\Delta n$ and a layer thickness d of the liquid crystal layer 5, i.e., the retardation $\Delta n \cdot d$. Therefore, making this value an appropriate one allows the achievement of the display giving high visibility. However, in the transflective liquid crystal device 1, the transmissive display light only once passes through the liquid crystal layer 5 and is emitted, whereas the reflective display light twice passes through the liquid crystal layer 5, and therefore, it is difficult to optimize the retardation $\Delta n \cdot d$ for both the transmissive display light and the reflective display light. Hence, if the layer thickness d of the liquid crystal layer 5 is set so that the display in a reflective mode has high visibility, the display in a transmissive mode will be sacrificed. Conversely, if the layer thickness d of the liquid crystal layer 5 is set so that the display in a transmissive mode has high visibility, the display in a reflective mode will be sacrificed.

Accordingly, Japanese Unexamined Patent Application Publication No. 11-242226 discloses a configuration in which the layer thickness d of the liquid crystal layer 5 in the reflective display region 31 is less than that of the liquid crystal layer 5 in the transmissive display region 32. Such a configuration is referred to as a "multi-gap type". For example, as shown in FIGS. 21A to 21C, this type of configuration can be implemented by a layer-thickness adjusting layer 6 in which a region corresponding to the transmissive display region 32 constitutes an opening, on the lower layer side of the first transparent electrode 11, and on the upper layer side of the light reflecting layer 4. More specifically, in the transmissive display region 32, the layer thickness d of the liquid crystal layer 5 is larger than in the reflective display region 31 by the layer thickness of the layer-thickness adjusting layer 6, and hence, it is possible to optimize the retardation $\Delta n \cdot d$ for both the transmissive display light and the reflective display light. Herein, in order to adjust the layer thickness d of the liquid crystal layer 5 by the layer-thickness adjusting layer 6, it is necessary to thickly form the layer-thickness adjusting layer 6. A photoresist or the like is used to form such a thick layer.

While a photolithography technique is used when the layer-thickness adjusting layer 6 is formed with a photoresist, the layer-thickness adjusting layer 6 becomes an upwardly inclined surface 60 in the boundary region of the reflective display region 31 and the transmissive display region 32, due to problems such as the exposure accuracy when performing the photolithography, the side etching during development. As a result, in the boundary portion of the reflective display region 31 and the transmissive display region 32, the layer thickness d of the liquid crystal layer 5 continuously varies, so that the retardation $\Delta n \cdot d$ continuously varies, as well. As for the liquid crystal molecules contained in the liquid crystal layer 5, the initial alignment condition is defined by alignment films 12 and 22 formed on the outermost layers of the first and second substrates 10 and 20, respectively. However, on the inclined surface 60, since the alignment regulating force on the alignment film 12 acts in an oblique direction, the alignment of the liquid crystal molecules in this portion is disturbed.

Even if the above-described boundary portion does not constitute an inclined surface, there is the possibility that the substrate and a stepped portion orthogonally intersect each other, thereby disturbing the alignment of the liquid crystal molecules.

As a consequence, in the conventional liquid crystal device 1, when it is designed, for example, as a normally white type, although the full screen must become black display with an electric field applied, light leaks from the portion corresponding to the inclined surface 60, thereby causing a display failure such as a reduction in the contrast.

To solve the above-described problems, the object of the present invention is to provide an arrangement capable of performing high-quality display even if the retardation is in an inappropriate condition, or the alignment of liquid crystal molecules is in a disturbed condition in the boundary portion of the transmissive display region and the reflective display region, in a multi-gap type liquid crystal device in which the layer thickness of the liquid crystal layer between the transmissive display region and the reflective display region within a single pixel has been changed into an appropriate value, and in an electronic device using the same.

SUMMARY OF THE INVENTION

In order to solve the above-described problems, the present invention provides a transflective liquid crystal device that comprises a first substrate with a first transparent electrodes formed on the surface thereof; a second substrate with second transparent electrodes formed on its surface side opposed to the first electrodes; and a liquid crystal layer held between the first and second substrates. The first substrate includes light reflecting layers each of which constitutes a reflective display region in one of pixel regions where the first transparent electrodes and the second transparent electrode are mutually opposed and each of which defines the remaining region of each of the pixel regions as a transmissive display region, layer-thickness adjusting layers each making it possible for the layer thickness of the liquid crystal layer in the reflective display region to be less than the layer thickness of the liquid crystal layer in the transmissive display region, and the first transparent electrodes, in a manner such as to be stacked in this order from the lower layer side to the upper layer side. Herein, on at least one of the first and second substrates, a light shielding film is formed so as to be superimposed on the boundary region of the reflective display region and the transmissive display region.

Also, the present invention provides a transflective liquid crystal device having reflective display regions and transmissive display regions. This transflective liquid crystal device comprises a first substrate; a second substrate with second transparent electrodes formed on its surface side opposed to the first electrodes; and a liquid crystal layer held between the first and second substrates. The first substrate includes, in the reflective display region, a layer-thickness adjusting layer making it possible for the layer thickness of the liquid crystal layer in the reflective display region to be less than the layer thickness of the liquid crystal layer in the transmissive display region, and a light reflecting electrode, in a manner such as to be stacked in this order from the lower layer side to the upper layer side. The first substrate also has a transparent electrode on each of the transmissive display regions. Herein, on at least one of the first and second substrates, a light shielding film is formed so as to be superimposed on the boundary region of the reflective display region and the transmissive display region.

Furthermore, the present invention provides a transflective liquid crystal device that comprises a first substrate with first transparent electrodes formed on the surface thereof; a second substrate with a second transparent electrodes formed on its surface side opposed to the first electrodes; and a liquid crystal layer held between the first and second substrates. The first substrate includes light reflecting layers each of which constitutes a reflective display region in one of pixel regions where the first transparent electrodes and the second transparent electrodes are mutually opposed and each of which defines the remaining region of each the pixel regions as a transmissive display region, and the first transparent electrodes, in a manner such as to be stacked in this order from the lower layer side to the upper layer side. The second substrate includes, in the reflective display region, a layer-thickness adjusting layer making it possible for the layer thickness of the liquid crystal layer in the reflective display region to be less than the layer thickness of the liquid crystal layer in the transmissive display region, and the second transparent electrodes, in a manner such as to be stacked in this order from the lower layer side to the upper layer side. Herein, on at least one of the first and the second substrates, a light shielding film is formed so as to be superimposed on the boundary region of the reflective display region and the transmissive display region.

Moreover, the present invention provides a transflective liquid crystal device having reflective display regions and transmissive display regions. This transflective liquid crystal device comprises a first substrate; a second substrate with second transparent electrodes formed on its surface side opposed to the first electrodes; and a liquid crystal layer held between the first and the second substrates. The first substrate has a light reflecting electrode formed on each of the reflective display regions, and a transparent electrode formed on each of the transmission region. The second substrate includes layer-thickness adjusting layers each making it possible for the layer thickness of the liquid crystal layer in the reflective display region to be less than the later thickness of the liquid crystal layer in the transmissive display region, and the transparent electrodes, in a manner such as to be stacked in this order from the lower layer side to the upper layer side. Herein, on at least one of the first and second substrates, a light shielding film is formed so as to be superimposed on the boundary region of the reflective display region and the transmissive display region.

In the present invention, the boundary region of the reflective display region and the transmissive display region refers to the region comprising the boundary of the reflective display region and the transmissive display region defined by the edge of the light reflecting layer or a light reflecting electrode, and the edge portion of the reflective display region adjacent to this boundary and/or the edge portion of the transmissive display region adjacent to this boundary.

In the present invention, light shielding films are each formed so as to be superimposed on the boundary region of the reflective display region and the transmissive display region. As a result, even when the thickness of each of the layer-thickness adjusting layers continuously varies, and consequently the retardation $\Delta n \cdot d$ continuously varies in this portion, or the alignment of liquid crystal molecules is disturbed, neither reflective display light nor transmissive display light would be emitted from such a region.

This prevents a malfunction such as a light leakage during black display, thus making it possible to provide high-contrast and high-quality display.

In the present invention, the light shielding film is formed, for example, on the first transparent substrate side. Alternatively, the light shielding film may be formed on the second transparent substrate side.

In the present invention, it is preferable that the layer-thickness adjusting layer be arranged so that the boundary region of the reflective display region and the transmissive display region constitutes an inclined surface.

In the present invention, it is preferable that the light shielding film be formed in the region in which the light shielding film is two-dimensionally superimposed on the inclined surface of the layer-thickness adjusting layer.

Here, that the light shielding film is formed in the region in which the light shielding film is two-dimensionally superimposed on the inclined surface, means that the inclined surface and the light shielding film are superimposed on each other in a plan view. Namely, the incline surface may be included in the light shielding film.

In the present invention, it is preferable that the light shielding film be formed so as to be two-dimensionally superimposed on the edge portion of the light reflecting layer. In this invention, the design is made so that the boundary region of the reflective display region and the transmissive display region is covered with the light shielding film. However, there is the possibility that, due to error in the formation of the light reflecting film and/or the error in the formation of the light shielding film, light leak from the boundary region of the reflective display region and the transmissive display region, that is, from the boundary region of the region where the light reflecting layer or the light reflecting electrode is formed and the remaining region, and that the leakage light transmits through portions where the layer-thickness adjusting layer varied in the thickness and/or portions where the alignment of liquid crystal molecules is disturbed, and is emitted, thereby causing malfunctions such as a reduction in the contrast. Accordingly, forming a light shielding film so as to be two-dimensionally superimposed on the edge portion of the light reflecting layer or the light reflecting electrode, allows the light leakage from the boundary region of the reflective display region and the transmissive display region to be reliably inhibited.

In the present invention, the transmissive display region is disposed, for example, in an insular shape within the reflective display region.

In the present invention, the transmissive display region may be disposed at the end portion of the pixel region.

In the present invention, when the pixel region is formed as a rectangular region, it is preferable that the transmissive display region have, for example, a rectangular shape at least one side of which is superimposed on a side of the pixel region. As the forming region of the light shielding film becomes wider, the quantity of light, which contributes to display, decreases, and thereby the display becomes darker. However, by superimposing a side of the transmissive display region on a side of the pixel region, the total length of the boundary region of the transmissive display region and the reflective display region, that is, the total length of the light shielding layer can be correspondingly reduced. Consequently, because the total length of the light shielding film 9 is short, the reduction in the amount of light contributed to the display can accordingly kept to a minimum. In this case, since light shielding films 90 and the light shielding wiring lines are, generally speaking, formed in the boundary regions of adjacent pixel regions 3, the parts of the periphery of the transmissive display region 32 that are covered by these light shielding films 90 do not of course contribute to display. Hence, even if there are disturbances in the retardation or in the alignments of liquid crystal at these portions, the deterioration of the quality of the display can be prevented.

As such a configuration, for example, the transmissive display region may have any one of a configuration in which the transmissive display region is positioned so that one side thereof is superimposed on a side of the pixel region, a configuration in which the transmissive display region is positioned so that two sides thereof are superimposed on sides of the pixel region, and a configuration in which the transmissive display region is positioned so that three sides thereof are superimposed on sides of the pixel region. Herein, when a light shielding wiring line runs as the light shielding film so as to divide the pixel region into two, and the reflective display region and the transmissive display region are disposed on respective opposite sides of the wiring line, a configuration in which the transmissive display region is positioned so that three sides thereof are superimposed on sides of the pixel region, is implemented.

In the present invention, when the reflective display regions and the transmissive display region are individually provided with a color filter, a transflective liquid crystal device for color display can be constituted. In this case, it is preferable that a reflective display color filter be formed in each of the reflective display regions, while a transmissive display color filter having a coloring degree higher than that of the reflective display color filter, be formed in each of the transmissive display regions.

In the present invention, the arrangement may be any one of a configuration in which the reflective display region is wider than the transmissive display region, a configuration in which the reflective display region is narrower than the transmissive display region, and a configuration in which the reflective display region and the transmissive display region are equal in area.

The liquid crystal device to which the present invention is applied, can be used as a display device for electronic devices such as portable telephones, mobile computers, and the like.

BRIEF DESCRIPTION OF THE DRAWINGS

FIG. 1A is a plan view thereof, and FIGS. 1B and 1C are representations of the A–A' section and the B–B' section thereof, respectively.

FIG. 2A is a plan view thereof, and FIGS. 2B and 2C are representations of the A–A' section and the B–B' section thereof, respectively.

FIGS. 3A to 3C are schematic views showing a single pixel region of a plurality of pixel regions formed into a matrix shape in a transflective liquid crystal device according to a third embodiment of the present invention, where FIG. 3A is a plan view thereof, and FIGS. 3B and 3C are representations of the A–A' section and the B–B' section thereof, respectively.

FIG. 4A is a plan view thereof, and FIG. 4B is a representation of the B–B' section thereof.

FIG. 21A is a plan view, and FIGS. 21B and 21C are representations of the A–A' section and the B–B' section thereof, respectively.

DETAILED DESCRIPTION OF THE PREFERRED EMBODIMENTS

Figure 1:
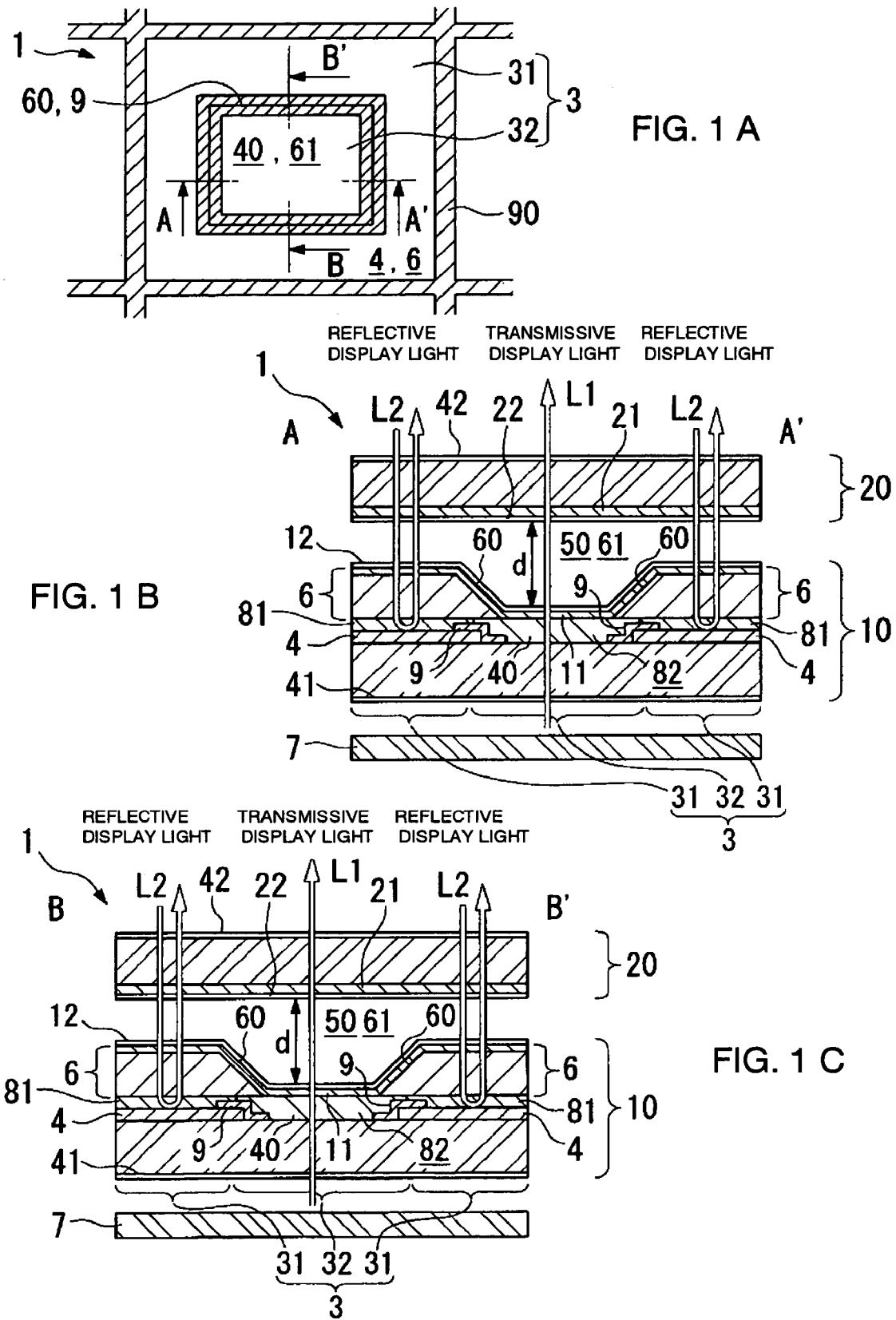
FIGS. 1A to 1C are schematic views showing a single pixel region of a plurality of pixel regions formed into a matrix shape in a transflective liquid crystal device according to a first embodiment of the present invention, where

The embodiments of the present invention will be described with reference to the drawings. In the drawings used for descriptions below, in order to make the dimensions of layers and members recognizable on drawings, different scales are used for each layer and every member.

First Embodiment

FIGS. 1a to 1c are schematic views showing a single pixel region of a plurality of pixel regions formed into a matrix shape in a liquid crystal device, where FIG. 1a is a plan view thereof, and FIGS. 1b and 1c are representations of the a–a' section and the b–b' section thereof, respectively. Since the liquid crystal device according to this embodiment has the same basic structure as in conventional liquid crystal devices, portions having the same functions are designated by the same reference numerals.

The pixel region shown in FIGS. 1A to 1C shows the portion of an active matrix type liquid crystal device to be described later that is common to cases where either TFDs or TFTs are used as non-linear elements for pixel switching. The liquid crystal device 1 illustrated here comprises a transparent first substrate 10 which is constituted of quartz or glass, and on the surface of which first transparent electrodes 11 each constituted of an ITO (Indium Tin Oxide) film or the like are formed; a transparent second substrate 20 which is constituted of quartz or glass, and on which second transparent electrodes each constituted of an ITO film or the like are formed on its surface side opposed to the first electrodes 11; a liquid crystal layer 50 including a TN mode liquid crystal held between the first substrate 10 and the second substrate 20. The regions where the first transparent electrodes 11 and the second transparent electrodes 21 are mutually opposed constitute the pixel regions 3, which directly contribute to display.

In the liquid crystal device 1, numbers of pixel regions 3 are formed into a matrix shape, and when the boundary regions of these pixel regions 3 are two-dimensionally viewed, light shielding films 90 referred to as "black matrixes" or "black stripes" formed on the first substrate 10 or second substrate 20, or light shielding wiring lines (not shown) run through the boundary regions. The pixel regions 3, therefore, are each in a state surrounded by the light shielding films 90 or light shielding wiring lines in a plan view.

On the first substrate 10, rectangular light reflecting layers 4 each constituting a reflective display region 31 are each constituted of an aluminum film or a silver alloy film, in the rectangular pixel region 3 where the first transparent electrode 11 and the second transparent electrode 21 are mutually opposed, and a rectangular opening 40 is formed at the center of each of the light reflecting layers 4. As a result, in each of the pixel regions 3, the region where the light reflecting layer 4 is formed constitutes the reflective display region 31, while the region corresponding to the opening 40 constitutes an insular and rectangular transmissive display region 32 where the light reflecting layer 4 is not formed.

Polarizers 41 and 42 are disposed on the outer surfaces of the first and second substrate 10 and 20, respectively, and a backlight device 7 is opposed to the polarizer 41 side.

In the liquid crystal device 1 with this arrangement, out of light emitted from the backlight device 7, the light that has fallen on the transmissive display region 32 enters the liquid crystal layer 50 from the first substrate 10 side, as indicated by the arrow L1. After having been subjected to an optical modulation at the liquid crystal layer 50, the light is emitted from the second substrate 20 side as transparent display light, thereby displaying an image (transmissive mode).

Also, out of external light entering from the second substrate 20 side, the light entering the reflective display region 31 reaches the reflective layer 4 through the liquid crystal layer 50, as indicated by the arrow L2. After having been reflected from the reflective layer 4, the light again passes through the liquid crystal layer 50, and is emitted from the second substrate 20 side as a reflective display light, thereby displaying an image (reflective mode).

Here, on the first substrate 10, a reflective display color filter 81 and a transmissive display color filter 82 are formed in each of the reflective display regions 31 and each of the transmissive regions 32, respectively, thereby allowing color display. As a transmissive display color filter 82, a filter having a coloring degree higher than that of the reflective display color filter 81, such as a filter in which a large quantity of pigments are contained, is employed.

In such a transflective liquid crystal device 1, the transmissive display light only once passes through the liquid crystal layer 50 and is emitted, whereas the reflective display light twice passes through the liquid crystal layer 50. Accordingly, in the first substrate 10, on the lower layer side of the first transparent electrode 11, and on the upper layer side of the light reflecting layer 4, layer-thickness adjusting layers 6 each of which comprises a photoresist and in which a region corresponding to the transmissive display region 32 constitutes an opening 61 is formed. Therefore, in the transmissive display region 32, since the layer thickness d of the liquid crystal layer 50 is larger than in the reflective display region 31 by the layer thickness of the layer-thickness adjusting layer 6, it is possible to optimize the retardation $\Delta n \cdot d$ for both the transmissive display light and the reflective display light.

While a photolithography technique is used when the layer-thickness adjusting layer 6 is formed, the layer-thickness adjusting layer 6 constitutes an upwardly inclined surface 60 in the boundary region of the reflective display region 31 and the transmissive display region 32, due to problems such as the exposure accuracy when performing the photolithography, and the side etching during development. Specifically, this inclined surface 60 is formed so as to have a width of 8 $\mu$m in a plan view. As a result, in the boundary portion of the reflective display region 31 and the transmissive display region 32, the layer thickness d of the liquid crystal layer 50 continuously varies, so that the retardation $\Delta n \cdot d$ continuously varies, as well. As for the liquid crystal molecules contained in the liquid crystal layer 50, the initial alignment condition is defined by alignment films 12 and 22 formed on the outermost layer of the first and second substrates 10 and 20, respectively. However, on the inclined surface 60, since the aligning force of the alignment film 12 acts in an oblique direction, the alignment of the liquid crystal molecules in this portion is disturbed.

The boundary region in such an unstable state causes the degradation of the quality of display, and therefore, in this embodiment, on the first substrate 10, light shielding films 9 are each formed so as to be superimposed over the entire boundary region of the reflective display region 31 and the transmissive display region 32. Also, each of the light shielding films 9 is formed so as to have a width of about 9 $\mu$m and so that the inclined surface thereof 60 is included in the light shielding film 9 in a plan view. More specifically, in this embodiment, the light shielding film 9 constituted of a light shielding metallic film such as a chrome film, is formed into a rectangular frame shape along the entire inner peripheral edge of the light reflecting layer 4, which separates the reflective display region 31 and the transmissive display region 32, in a manner such that one portion of the light shielding film 9 covers the edge portion of the light reflecting layer 4.

In this manner, in the present embodiment, each of the light shielding films 9 is formed so as to be superimposed over the entire boundary region of the reflective display region 31 and the transmissive display region 32. As a result, even when the thickness of each of the layer-thickness adjusting layers 6 continuously varies in the boundary region of the reflective display region 31 and the transmissive display region 32, and consequently the retardation $\Delta n \cdot d$ continuously varies in this portion, or the alignment of liquid crystal molecules is disturbed, neither reflective display light nor transmissive display light would be emitted from such a region. Also, since each of the light shielding films 9 is formed so as to be two-dimensionally superimposed on the inner peripheral edge of the light reflecting layer 4, there is no risk of light leakage occurring in the boundary region of the reflective display region 31 and the transmissive display region 32. This prevents a malfunction such as a light leakage during black display, thus making it possible to provide high-contrast and high-quality display.

As a transmissive display color filter 82, a filter having a coloring degree higher than that of a reflective display color filter 81 is used. As a result, even in an arrangement in which the transmissive display light passes through the color filter only once, the display is subjected to coloring equivalent to that of the reflective display light, which twice passes through the color filter, thereby allowing the achievement of a high quality color display.

When producing the liquid crystal device 1 with such a structure, the first substrate 10 is formed as follows.

First, a first substrate 10 comprising quartz or glass is prepared, and a reflective metallic film such as aluminum or silver alloy is formed over the entire surface thereof. Then, the photolithography technique is used to pattern this metallic film to form light reflecting layers 4. When attempting to provide the first substrate with a scattering function, a scattering structure may be formed by glass etching or by using resin before forming the metallic film.

Next, a light shielding metallic film such as chrome is formed over the entire surface of the first substrate 10, and then the photolithography technique is used to pattern this metallic film to form the light shielding films 9.

Then, a flexo printing method, the photolithography technique, or an ink jet printing method is used to form the reflective display color filters 81 and the transmissive display color filters 82 on respective predetermined regions.

Thereafter, a spin coat method is used to apply a photoresist over the entire surface of the first substrate 10, and then the layer-thickness adjusting layers 6 are formed by exposure and development processes.

Next, a transparent conductive film such as an ITO film is formed over the entire surface of the first substrate 10, and then the photolithography technique is used for patterning this transparent conductive film to form the first transparent electrodes 11.

Then, the spin coat method is used to apply polyimide resin over the entire surface of the first substrate 10, and after conducting a baking treatment, an alignment film 12 is formed by performing an aligning treatment such as a rubbing treatment.

The first substrate 10 formed in this way is bonded to the second substrate 20 that has been formed separately, with a predetermined distance therebetween, and then a liquid crystal is injected between the substrates to form the liquid crystal layer 50.

In the liquid crystal device 1, non-linear elements for pixel switching, such as TFDs or TFTs, may be formed on the first substrate 1 side. In such cases, the light shielding films 9 and other layers may be formed by making use of a portion of the process of forming the TFDs or the TFTs.

As for the arrangement comprising the reflective display region 31 and transmissive display region 32, any structure may be selected out of a structure in which the reflective display region 31 is wider than the transmissive display region 32, a structure in which the reflective display region 31 is narrower than the transmissive display region 32, and a structure in which the reflective display region 31 and the transmissive display region 32 are equal in area.

Second Embodiment

Figure 2:
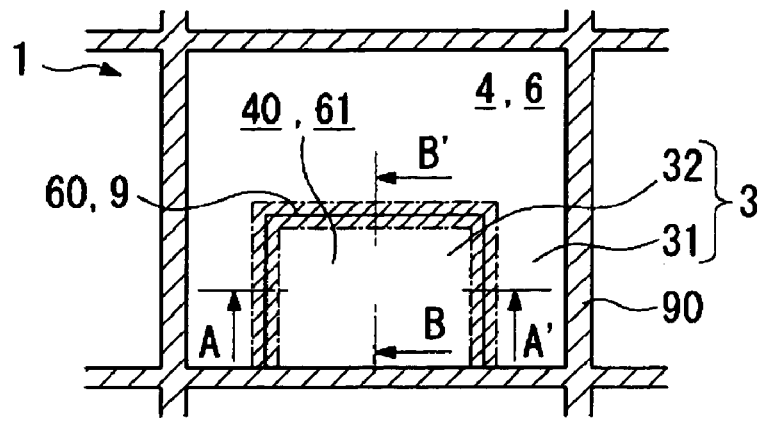
FIGS. 2A to 2C are schematic views showing a single pixel region of a plurality of pixel regions formed into a matrix shape in a transflective liquid crystal device according to a second embodiment of the present invention, where
Figure 2:
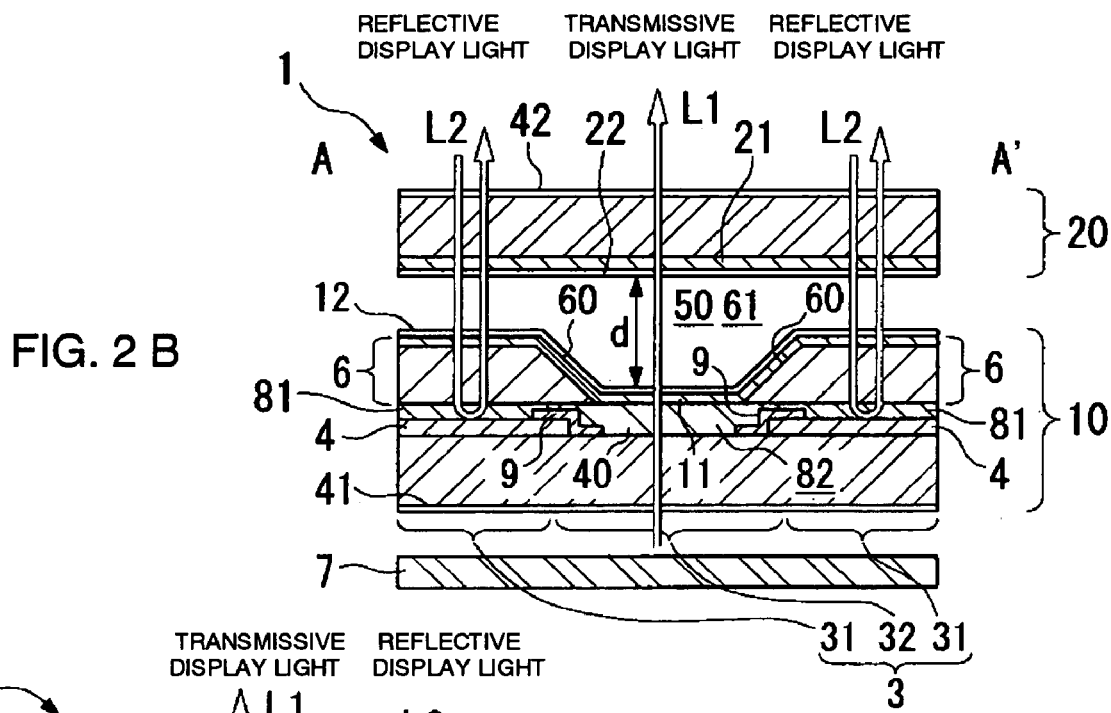
Figure 2:
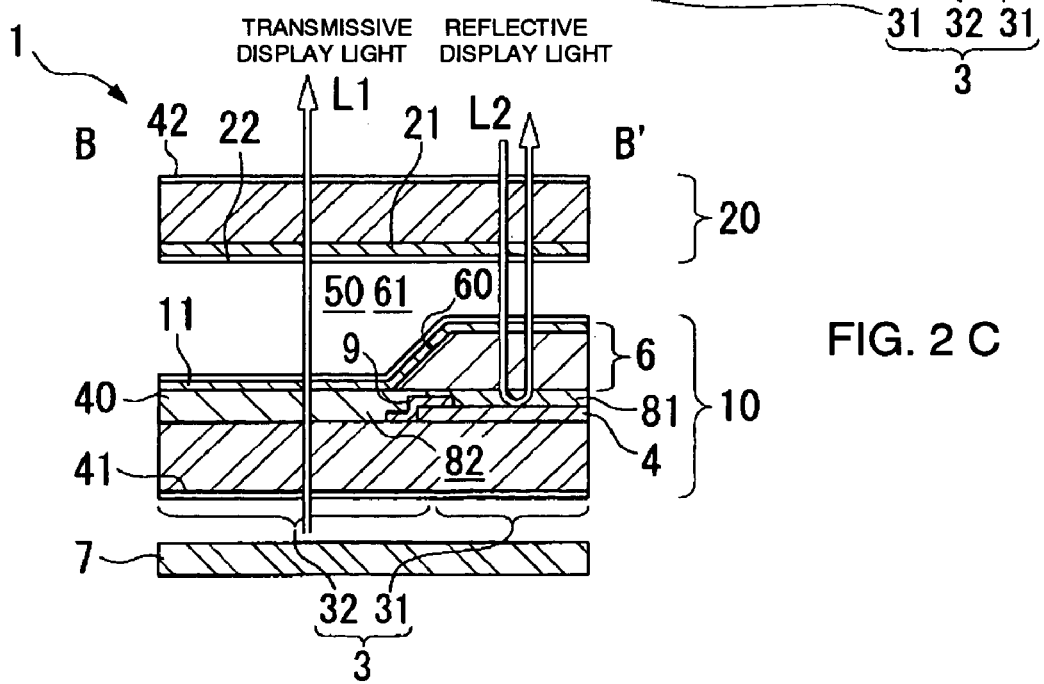

FIGS. 2A to 2C are schematic views showing a single pixel region of a plurality of pixel regions formed into a matrix shape in a liquid crystal device of this embodiment, where FIG. 2A is a plan view thereof, and FIGS. 2B and 2C are representations of the A–A' section and the B–B' section thereof, respectively. Since the liquid crystal devices according to this embodiment and third to eighth embodiments has the same basic structure as in the first embodiment, portions with the same functions are designated by the same reference numerals, without detailed description. The producing method for this embodiment is also the same as that for the first embodiment, and the explanation thereof is omitted.

As in the case of the first embodiment, the pixel region shown in FIGS. 2A to 2C shows the portion of an active matrix type liquid crystal device that is common to cases where either TFDs or TFTs are used as non-linear elements for pixel switching. The liquid crystal device 1 illustrated here also comprises a transparent first substrate 10 with first transparent electrodes 11 formed on the surface thereof; a transparent second substrate 20 with second transparent electrodes formed on its surface side opposed to the first electrodes 11; and a liquid crystal layer 50 including a TN mode liquid crystal held between the first substrate 10 and the second substrate 20. The regions where the first transparent electrodes 11 and the second transparent electrodes 21 are mutually opposed constitute the pixel regions 3, which directly contribute to display. The pixel regions 3 are each in a state surrounded by the light shielding films 90 or light shielding wiring lines in a plan view.

On the first substrate 10, light reflecting layers 4 each constituting reflective display region 31 are each formed of an aluminum film or a silver alloy film, in the rectangular pixel region 3 where the first transparent electrode 11 and the second transparent electrode 21 are mutually opposed, and a rectangular opening 40 is formed at the portion corresponding to one side of each of the light reflecting layers 4. As a result, in each of the pixel regions 3, the region where the light reflecting layer 4 is formed constitutes the reflective display region 31, while the region corresponding to the opening 40 constitutes a rectangular transmissive display region 32 where the light reflecting layer 4 is not formed. Here, one side of the transmissive display region 32 is superimposed on one side of the pixel region 3.

Polarizers 41 and 42 are disposed on the outer surfaces of the first and second substrate 10 and 20, respectively, and a backlight device 7 is opposed to the polarizer 41 side. Also, on the first substrate 10, a reflective display color filter 81 and a transmissive display color filter 82 are formed in each of the reflective display regions 31 and each of the transmissive display regions 32, respectively, thereby allowing color display.

In this embodiment also, in the first substrate 10, on the lower layer side of the first transparent electrode 11, and on the upper layer side of the light reflecting layer 4, there are provided layer-thickness adjusting layers 6 each of which comprises a photoresist and in each of which a region corresponding to the transmissive display region 32 constitutes an opening 61. Therefore, in the transmissive display region 32, since the layer thickness d of the liquid crystal layer 5 is larger than in the reflective display region 31 by the layer thickness of the layer-thickness adjusting layer 6, the retardation $\Delta n \cdot d$ is optimized for both the transmissive display light and the reflective display light.

In each of the layer-thickness adjusting layers 6, an upwardly inclined surface 60 is formed in the boundary region of the reflective display region 31 and the transmissive display region 32 so as to have a width of 8 $\mu$m. Accordingly, in this embodiment, on the first substrate 10, light shielding films 9 are each formed in a U-shape in a plan view so as to be superimposed over the entire boundary region of the reflective display region 31 and the transmissive display region 32. Each of the light shielding film 9 has a width of 9 $\mu$m, and is formed so that the inclined surface 60 is included in the light shielding film 9 in a plan view. More specifically, in this embodiment, each of the light shielding films 9 comprising a light shielding metallic film such as a chrome film, is formed into a U-shape along the three sides except the region that is superimposed on one side of the pixel region 3, out of the four sides of the rectangular transmissive display region 32, in a manner such that one portion of the light shielding film 9 covers the edge portion of the light reflecting layer 4.

Accordingly, in this embodiment, since each of the light shielding films 9 is formed so as to be superimposed over the entire boundary region of the reflective display region 31 and the transmissive display region 32 as in the case of the first embodiment, it is possible to prevent a malfunction such as a light leakage in the boundary region of the reflective display region 31 and the transmissive display region 32, during black display. Thus, this embodiment produces the same effect as that of the first embodiment.

As the forming region of the light shielding film 9 becomes wider, the quantity of light, which contributes to display, decreases, and the display tends to be darker. However, in this embodiment, the light shielding film 9 is formed in a U-shape in a plan view, and the light shielding film 9 is not formed at the portion corresponding to one side of the transmissive display region 32. Consequently, because the total length of the light shielding film 9 is short, the reduction in the amount of light contributed to the display can accordingly be kept to a minimum. In this case, since light shielding film 90 and light shielding wiring lines are, generally speaking, formed in the boundary regions of adjacent pixel regions 3, the parts of the periphery of the transmissive display region 32 that are covered by these light shielding films 90 do not of course contribute to display. Hence, even if there are disturbances in the retardation or in the alignment of liquid crystal in these portions, the deterioration of the quality of the display can be prevented.

In this embodiment, since the end portions of the light shielding film 9 reach the boundary region of the adjacent pixel region 3, the light shielding film 9 may be formed as an extending portion from another light shielding film 90 or light shielding wiring line passing through this boundary region.

As for the arrangement comprising the reflective display region 31 and transmissive display region 32, any structure may be selected out of a structure in which the reflective display region 31 is wider than the transmissive display region 32, a structure in which the reflective display region 31 is narrower than the transmissive display region 32, and a structure in which the reflective display region 31 and the transmissive display region 32 are equal in area.

Third Embodiment

FIGS. 3A to 3C are schematic views showing a single pixel region of a plurality of pixel regions formed into a matrix shape in a liquid crystal device of this embodiment, where FIG. 3A is a plan view thereof, and FIGS. 3B and 3C are representations of the A–A' section and the B–B' section thereof, respectively.

As in the case of the first embodiment, the pixel region shown in FIGS. 3A to 3C shows the portion of an active matrix type liquid crystal device that is common to cases where either TFDs or TFTs are used as non-linear elements for pixel switching. The liquid crystal device 1 illustrated here also comprises a transparent first substrate 10 with first transparent electrodes 11 formed on the surface thereof; a transparent second substrate 20 with second transparent electrodes formed on its surface side opposed to the first electrodes 11; and a liquid crystal layer 50 including a TN mode liquid crystal held between the first substrate 10 and the second substrate 20. The regions where the first transparent electrodes 11 and the second transparent electrodes 21 are mutually opposed constitute the pixel regions 3, which directly contribute to display. The pixel regions 3 are each in a state surrounded by the light shielding films 90 or light shielding wiring lines in a plan view.

On the first substrate 10, light reflecting layers 4 each constituting a reflective display region 31 are each formed of an aluminum film or a silver alloy film, in the rectangular pixel region 3 where the first transparent electrode 11 and the second transparent electrode 21 are mutually opposed, and a rectangular opening 40 is formed at the portion corresponding to a corner of each of the light reflecting layers 4. As a result, in each the pixel regions 3, the region where the light reflecting layer 4 is formed constitutes the reflective display region 31, while the region corresponding to the opening 40 constitutes the rectangular transmissive display region 32 where the light reflecting layer 4 is not formed. Here, two sides of the transmissive display region 32 is superimposed on two sides of the pixel region 3.

Polarizers 41 and 42 are disposed on the outer surfaces of the first and second substrate 10 and 20, respectively, and a backlight device 7 is opposed to the polarizer 41 side. Also, on the first substrate 10, a reflective display color filter 81 and a transmissive display color filter 82 are formed in each of the reflective display regions 31 and each of the transmissive display regions 32, respectively, thereby allowing color display.

Also, in the first substrate 10, on the lower layer side of the first transparent electrode 11, and on the upper layer side of the light reflecting layer 4, there are provided layer-thickness adjusting layers 6 each of which comprises a photoresist and in each of which a region corresponding to the transmissive display region 32 constitutes an opening 61.

Therefore, in the transmissive display regions 32, since the layer thickness d of the liquid crystal layer 5 is larger than in the reflective display region 31 by the layer thickness of the layer-thickness adjusting layer 6, the retardation $\Delta n \cdot d$ is optimized for both the transmissive display light and the reflective display light.

In each of the layer-thickness adjusting layers 6, an upwardly inclined surface 60 is formed in the boundary region of the reflective display region 31 and the transmissive display region 32 so as to have a width of 8 $\mu$m. Accordingly, in this embodiment, on the first substrate 10, light shielding films 9 are each formed in an L-shape in a plan view so as to be superimposed over the entire boundary region of the reflective display region 31 and the transmissive display region 32. Each of the light shielding films 9 has a width of 9 $\mu$m, and is formed so that the inclined surface 60 is included in the light shielding film 9 in a plan view. More specifically, in this embodiment, each of the light shielding film 9 comprising a light shielding metallic film such as a chrome film, is formed into an L-shape along the two sides except the region that is superimposed on two sides of the pixel region 3, out of the four sides of the rectangular transmissive display region 32, in a manner such that one portion of the light shielding film 9 covers the edge portion of the light reflecting layer 4.

Accordingly, in this embodiment, since each of the light shielding films 9 is formed so as to be superimposed over the entire boundary region of the reflective display region 31 and the transmissive display region 32 as in the case of the first embodiment, it is possible to prevent a malfunction such as a light leakage in the boundary region of the reflective display region 31 and the transmissive display region 32, during black display. Thus, this embodiment produces the same effect as that of the first embodiment.

As the forming region of the light shielding film 9 becomes wider, the quantity of light, which contributes to display, decreases, and the display tends to be darker. However, in this embodiment, the light shielding film 9 is formed in an L-shape in a plan view, and the light shielding film 9 is not formed at the portion corresponding to the two sides of the transmissive display region 32. Consequently, because the total length of the light shielding film 9 is short, the reduction in the amount of light contributed to display can be accordingly kept to a minimum. In this case, since light shielding films 90 and light shielding wiring lines are, generally speaking, formed in the boundary regions of adjacent pixel regions, the part of the periphery of the transmissive display region 32 that are covered by these light shielding films 90 do not of course contribute to display. Hence, even if there are disturbances in the retardation or in the alignment of liquid crystal in these portions, the deterioration of the quality of the display can be prevented.

In this embodiment, since the end portions of the light shielding film 9 reach the boundary region of the adjacent pixel region 3, the light shielding film 9 may be formed as an extending portion of another light shielding film 90 or light shielding wiring line passing through this boundary region.

As for the arrangement comprising the reflective display region 31 and transmissive display region 32, any structure may be selected out of a structure in which the reflective display region 31 is wider than the transmissive display region 32, a structure in which the reflective display region 31 is narrower than the transmissive display region 32, and a structure in which the reflective display region 31 and the transmissive display region 32 are equal in area.

Fourth Embodiment

Figure 4A:
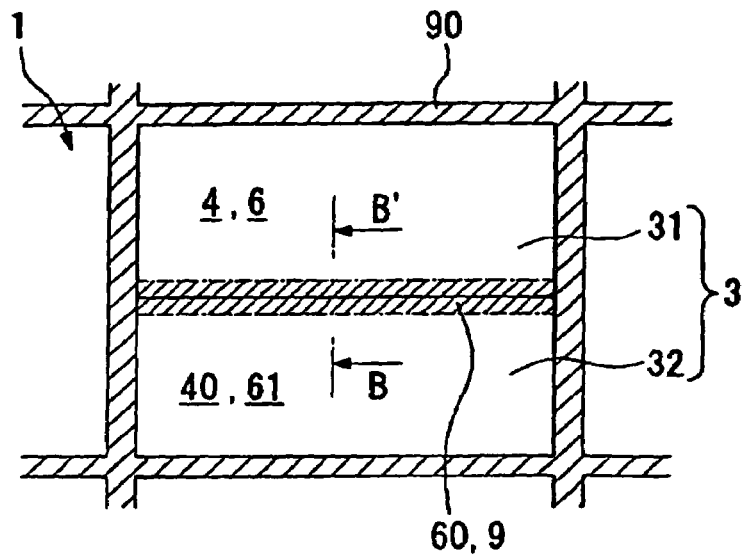
FIGS. 4A and 4B are schematic views showing a single pixel region of a plurality of pixel regions formed into a matrix shape in a transflective liquid crystal device according to a fourth embodiment of the present invention, where
Figure 4B:
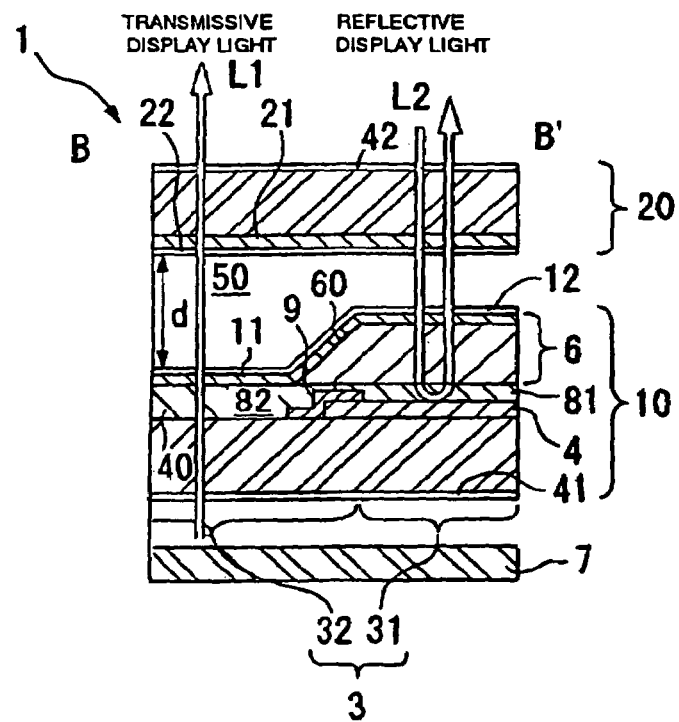

FIGS. 4A and 4B are schematic views showing a single pixel region of a plurality of pixel regions formed into a matrix shape in a liquid crystal device of this embodiment, where FIG. 4A is a plan view thereof, and FIG. 4B is a representation of the B–B' section thereof.

As in the case of the first embodiment, the pixel region shown in FIGS. 4A and 4B shows the portion of an active matrix type liquid crystal device that is common to cases where either TFDs or TFTs are used as non-linear elements for pixel switching. The liquid crystal device 1 illustrated here also comprises a transparent first substrate 10 which is constituted of quartz, glass or the like, and on the surface of which first transparent electrodes 11 each constituted of an ITO film or the like is formed; a transparent second substrate 20 which is constituted of quartz, glass or the like, and on which second transparent electrodes each constituted of an ITO film or the like, is formed on the surface side opposed to the first electrodes 11; and a liquid crystal layer 50 including a TN type liquid crystal held between the first substrate 10 and the second substrate 20. The regions where the first transparent electrodes 11 and the second transparent electrodes 21 are mutually opposed constitute the pixel regions 3, which directly contribute to display. The pixel regions 3 are each in a state surrounded by the light shielding films 90 or light shielding wiring lines in a plan view.

On the first substrate 10, light reflecting layers 4 each constituting a reflective display region 31 are each formed of an aluminum film or a silver alloy film, in the rectangular pixel region 3 where the first transparent electrode 11 and the second transparent electrode 21 are mutually opposed, while a region equivalent to about a half of each of the pixel regions 3 constitutes a rectangular opening 40 where the light reflecting layer 4 is not formed. As a result, in each of the pixel region 3, the region where the light reflecting layer 4 is formed constitutes the reflective display region 31, while the region corresponding to the opening 40 constitutes the rectangular transmissive display region 32 where the light reflecting layer 4 is not formed. Here, three sides of the transmissive display region 32 is superimposed on three sides of the pixel region 3.

Polarizers 41 and 42 are disposed on the outer surfaces of the first and second substrate 10 and 20, respectively, and a backlight device 7 is opposed to the polarizer 41 side. Also, on the first substrate 10, a reflective display color filter 81 and a transmissive display color filter 82 are formed in each of the reflective display regions 31 and each of the transmissive display regions 32, respectively, thereby allowing color display.

Also, in the first substrate 10, on the lower layer side of the first transparent electrode 11, and on the upper layer side of the light reflecting layer 4, there are provided layer-thickness adjusting layers 6 each of which comprises a photoresist and in which a region corresponding to the transmissive display region 32 constitutes an opening 61. Therefore, in the transmissive display region 32, since the layer thickness d of the liquid crystal layer 5 is larger than in the reflective display region 31 by the layer thickness of the layer-thickness adjusting layer 6, the retardation Δn·d is optimized for both the transmissive display light and the reflective display light.

In each of the layer-thickness adjusting layers 6, an upwardly inclined surface 60 is formed in the boundary region of the reflective display region 31 and the transmissive display region 32 so as to have a width of 8 μm. Accordingly, in this embodiment, on the first substrate 10, light shielding films 9 are each formed in line so as to be superimposed over the entire boundary region of the reflective display region 31 and the transmissive display region 32. Each of the light shielding film 9 has a width of 9 μm, and is formed so that the inclined surface 60 is included in the light shielding film 9 in a plan view. More specifically, in this embodiment, light shielding films 9 each comprising a light shielding metallic film such as a chrome film, are each formed in line along the one side except the region that is superimposed on three sides of the pixel region 3, out of the four sides of the rectangular transmissive display region 32, in a manner such that one portion of the light shielding film 9 covers the edge portion of the light reflecting layer 4.

Accordingly, in this embodiment, since each of the light shielding films 9 is formed so as to be superimposed over the entire boundary region of the reflective display region 31 and the transmissive display region 32 as in the case of the first embodiment, it is possible to prevent a malfunction such as a light leakage in the boundary region of the reflective display region 31 and the transmissive display region 32, during black display. Thus, this embodiment produces the same effect as that of the first embodiment.

As the forming region of the light shielding film 9 becomes wider, the quantity of light, which contributes to display, decreases, and the display trends to be darker. However, in this embodiment, the light shielding film 9 is formed in line, and the light shielding film 9 is not formed at the portion corresponding to the three sides of the transmissive display region 32 out of the four sides of the transmissive display region 32. Consequently, because the total length of the light shielding film 9 is short, the reduction in the amount of light contributed to the display can accordingly be kept to a minimum. In this case, since light shielding films 90 and the light shielding wiring lines are, generally speaking, formed in the boundary regions of adjacent pixel regions 3, the part of the periphery of the transmissive display regions 32 that are covered by these light shielding films 90 do not of course contribute to display. Hence, even if there are disturbances in the retardation or in the alignment of liquid crystal in these portions, the deterioration of the quality of the display can be prevented.

In this embodiment, since the end portions of the light shielding film 9 reach the boundary region of the adjacent pixel region 3, the light shielding film 9 may be formed as an extending portion of another light shielding film 90 or light shielding wiring line passing through this boundary region.

As for the arrangement comprising the reflective display region 31 and transmissive display region 32, any structure may be selected out of a structure in which the reflective display region 31 is wider than the transmissive display region 32, a structure in which the reflective display region 31 is narrower than the transmissive display region 32, and a structure in which the reflective display region 31 and the transmissive display region 32 are equal in area.

Fifth Embodiment

Figure 5:
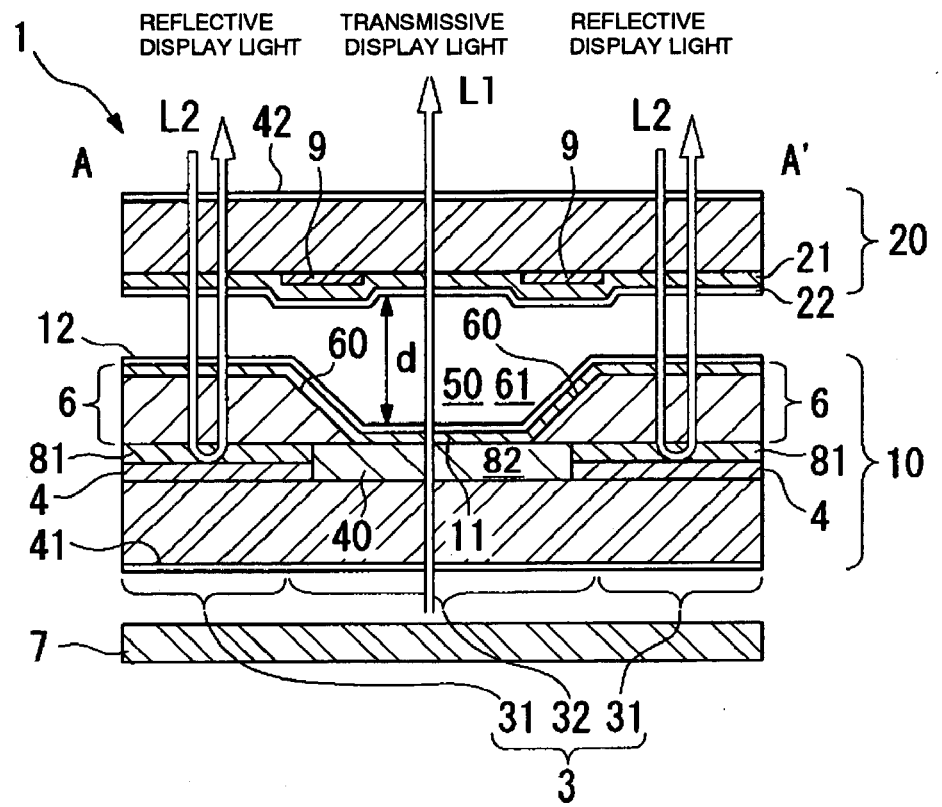
FIG. 5 is a sectional view showing a plurality of pixel regions formed into a matrix shape in a transflective liquid crystal device according to a fifth embodiment of the present invention, this sectional view corresponding to FIG. 1B.

The liquid crystal device of this embodiment is one in which the layout of the light shielding film 9 according to the first embodiment has been modified. Since the plan view of the pixel region of this embodiment is the same as FIG. 1A, FIG. 1A is used also in this embodiment. Here, only an A–A' sectional view of this embodiment is illustrated in FIG. 5. The B–B' sectional view thereof is omitted from illustration since it is the same as FIG. 5. As in the case of the first embodiment, the pixel region shown in FIG. 5 shows the portion of an active matrix type liquid crystal device that is common to cases where either TFDs or TFTs are used as non-linear elements for pixel switching.

The liquid crystal device 1 illustrated here also comprises a transparent first substrate 10 with first transparent electrodes 11 formed on the surface thereof; a transparent second substrate 20 with second transparent electrodes formed on its surface side opposed to the first electrodes 11; and a liquid crystal layer 50 including a TN mode liquid crystal held between the first substrate 10 and the second substrate 20. The regions where the first transparent electrodes 11 and the second transparent electrodes 21 are mutually opposed constitute the pixel regions 3, which directly contribute to display. The pixel regions 3 are each in a state surrounded by the light shielding films 90 or light shielding wiring lines in a plan view. On the first substrate 10, rectangular light reflecting layers 4 each constituting a reflective display region 31 are each formed of an aluminum film or a silver alloy film, in the rectangular pixel region 3 where the first transparent electrode 11 and the second transparent electrode 21 are opposed, and a rectangular opening 40 is formed at the center of each of the light reflecting layers 4. As a result, in each of the pixel regions 3, the region where the light reflecting layers 4 is formed constitutes the reflective display region 31, while the region corresponding to the opening 40 constitutes an insular and rectangular transmissive display region 32 where the light reflecting layer 4 is not formed.

Polarizers 41 and 42 are disposed on the outer surfaces of the first and second substrate 10 and 20, respectively, and a backlight device 7 is opposed to the polarizer 41 side. Also, on the first substrate 10, a reflective display color filter 81 and a transmissive display color filter 82 are formed in each of the reflective display regions 31 and each of the transmissive display regions 32, respectively, thereby allowing color display. In this embodiment also, on the first substrate 10, layer-thickness adjusting layers 6 are formed, each of which comprises a photoresist and in which a region corresponding to the transmissive display region 32 constitutes an opening on the lower layer side of the first transparent electrode 11, and on the upper layer side of the light reflecting layer 4. Therefore, in the transmissive display region 32, since the layer thickness d of the liquid crystal layer 5 is larger than in the reflective display region 31 by the layer thickness of the layer-thickness adjusting layer 6, the retardation $\Delta n \cdot d$ is optimized for both the transmissive display light and the reflective display light.

In each of the layer-thickness adjusting layers 6, an upwardly inclined surface 60 is formed in the boundary region of the reflective display region 31 and the transmissive display region 32 so as to have a width of 8 $\mu$m. Accordingly, in this embodiment, on the second substrate 20, light shielding films 9 are each formed in a rectangular frame shape so as to be superimposed over the entire boundary region of the reflective display region 31 and the transmissive display region 32 in a plan view. Each of the light shielding film 9 has a width of 9 $\mu$m, and is formed so that the inclined surface 60 is included in the light shielding film 9 in a plan view.

Accordingly, in this embodiment, since each of the light shielding films 9 is formed so as to be superimposed over the entire boundary region of the reflective display region 31 and the transmissive display region 32 as in the case of the first embodiment, it is possible to prevent a malfunction such as a light leakage in the boundary region of the reflective display region 31 and the transmissive display region 32, during black display. Thus, this embodiment produces the same effect as that of the first embodiment.

Sixth Embodiment

Figure 6:
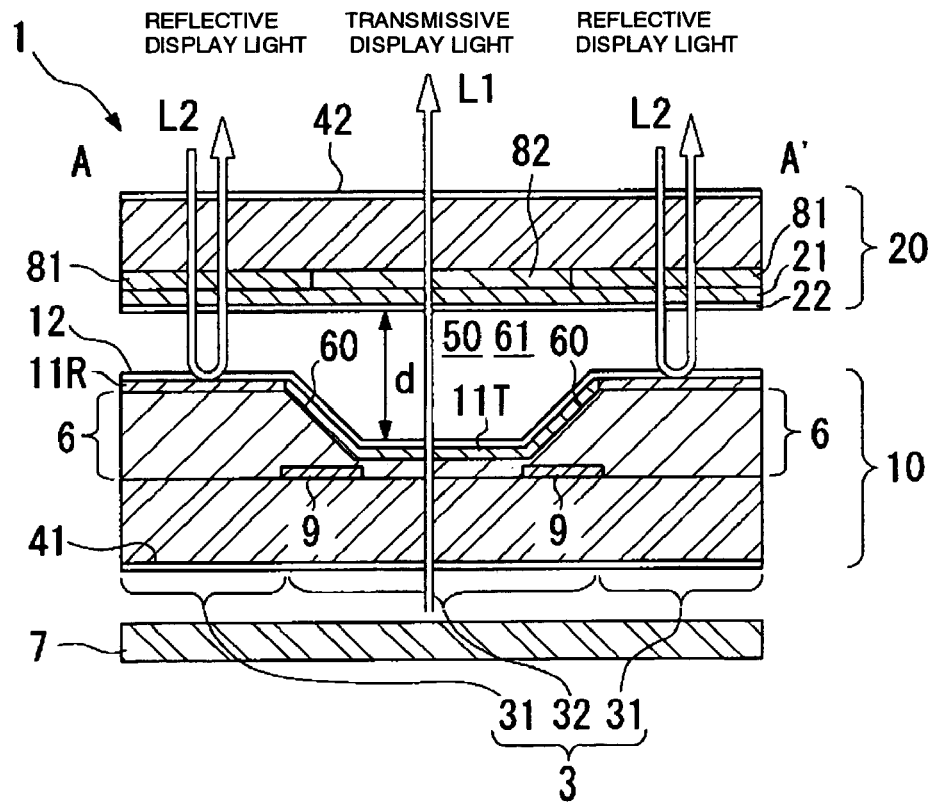
FIG. 6 is a sectional view showing a plurality of pixel regions formed into a matrix shape in a transflective liquid crystal device according to a sixth embodiment of the present invention, this sectional view corresponding to FIG. 1B.

The liquid crystal device of this embodiment is a modification in which the structure of pixel electrodes and the arrangement of color filters formed on the first substrate 10 of the liquid crystal device according to the first embodiment have been modified. Since the plan view of the pixel region of this embodiment is the same as FIG. 1A, FIG. 1A is also used in this embodiment. Here, only an A–A' sectional view of this embodiment is illustrated in FIG. 6. The B–B' sectional view thereof is omitted from illustration since it is the same as FIG. 6. As in the case of the first embodiment, the pixel region shown in FIG. 6 shows the portion of an active matrix type liquid crystal device that is common to cases where either TFDs or TFTs are used as non-linear elements for pixel switching.

The liquid crystal device 1 illustrated here comprises a transparent first substrate 10 with pixel electrodes 11T and 11R formed on the surface thereof; a transparent second substrate 20 with second transparent electrodes 21 formed on its surface side opposed to the first substrate 10; and a liquid crystal layer 50 including a TN mode liquid crystal held between the first substrate 10 and the second substrate 20. The regions where the pixel electrodes 11T and 11R and the second transparent electrodes 21 are mutually opposed constitute the pixel regions 3, which directly contribute to display. The pixel regions 3 are each in a state surrounded by the light shielding films 90 or light shielding wiring lines in a plan view, and are each disposed in the opening 40.

Here, the pixel electrodes formed on the first substrate 10 comprise light reflecting electrodes 11 R each constituted of an aluminum film or a silver alloy film and first transparent electrodes 11T each constituted of an ITO film or the like. The light reflecting electrodes 11R are each formed in a rectangular frame shape along the outer periphery of the pixel region 3, and the first transparent electrodes 11T are each disposed inside the opening 40 at the central portion. Namely, in this embodiment, the arrangement is made such that each of the light reflecting layers also serves as a pixel electrode. As a result, in each of the pixel region 3, the region where the light reflecting electrode 11 R is formed constitutes the reflective display region 31, while the region corresponding to the opening 40 constitutes an insular and rectangular transmissive display region 32 where the light reflecting electrode 11R is not formed.

Polarizers 41 and 42 are disposed on the outer surfaces of the first and second substrate 10 and 20, respectively, and a backlight device 7 is opposed to the polarizer 41 side. Also, in this embodiment, on the second substrate 20, a reflective display color filter 81 and a transmissive display color filter 82 are formed in each of the reflective display regions 31 and each of the transmissive display regions 32, respectively, thereby allowing color display. On these color filters, the above-described second transparent electrodes 21 are formed.

In this embodiment, on the lower layer side of the pixel electrodes 11 R and 11T, there are provided layer-thickness adjusting layers 6 each of which comprises a photoresist and in each of which a region corresponding to the transmissive display region 32 constitutes an opening 61. Therefore, in the transmissive display region 32, since the layer thickness d of the liquid crystal layer 5 is larger than in the reflective display region 31 by the layer thickness of the layer-thickness adjusting layer 6, the retardation $\Delta n \cdot d$ is optimized for both the transmissive display light and the reflective display light.

In each of the layer-thickness adjusting layers 6, an upwardly inclined surface 60 is formed in the boundary region of the reflective display region 31 and the transmissive display region 32 so as to have a width of 8 μm. Accordingly, in this embodiment, on the first substrate 10, each of the light shielding films 9 is formed in a rectangular frame shape so as to be superimposed over the entire boundary region of the reflective display region 31 and the transmissive display region 32 in a plan view. Each of the light shielding film 9 has a width of 9 μm, and is formed so that the inclined surface 60 is included in the light shielding film 9 in a plan view.

Accordingly, in this embodiment, since each of the light shielding films 9 is formed so as to be superimposed over the entire boundary region of the reflective display region 31 and the transmissive display region 32 as in the case of the first embodiment, it is possible to prevent a malfunction such as a light leakage in the boundary region of the reflective display region 31 and the transmissive display region 32, during black display. Thus, this embodiment produces the same effect as that of the first embodiment.

Meanwhile, in the above-described sixth embodiment, while the light shielding film 9 are each formed on the first substrate 10 side, the light shielding film 9 may be each formed on the second substrate 20 side as in the case of the fifth embodiment. In this case also, the same effect can be exerted.

Seventh Embodiment

Figure 7:
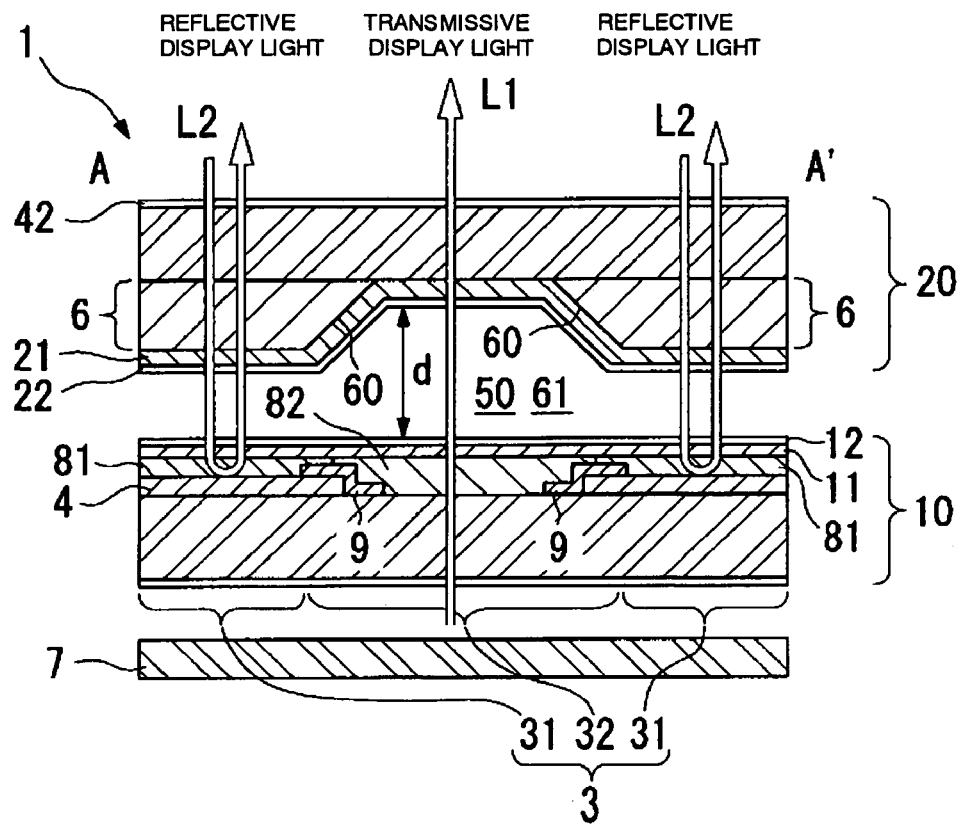
FIG. 7 is a sectional view showing a plurality of pixel regions formed into a matrix shape in a transflective liquid crystal device according to a seventh embodiment of the present invention, this sectional view corresponding to FIG. 1B.

The liquid crystal device of this embodiment is a modification in which the arrangement of the layer-thickness adjusting layers 6 according to the first embodiment has been modified. Since the plan view of the pixel region of this embodiment is the same as FIG. 1A, FIG. 1A is also used in this embodiment. Here, only an A–A' sectional view of this embodiment is illustrated in FIG. 7. The B–B' sectional view thereof is omitted from illustration since it is the same as FIG. 7. As in the case of the first embodiment, the pixel region shown in FIG. 7 shows the portion of an active matrix type liquid crystal device that is common to cases where either TFDs or TFTs are used as non-linear elements for pixel switching.

The liquid crystal device 1 illustrated here also comprises a transparent first substrate 10 with first transparent electrodes 11 formed on the surface thereof; a transparent second substrate 20 with second transparent electrodes formed on its surface side opposed to the first electrodes 11; and a liquid crystal layer 50 including a TN mode liquid crystal held between the first substrate 10 and the second substrate 20. The regions where the first transparent electrodes 11 and the second transparent electrodes 21 are mutually opposed constitute the pixel regions 3, which directly contribute to play. The pixel regions 3 are each in a state surrounded by the light shielding films 90 or light shielding wiring lines in a plan view. On the first substrate 10, rectangular light reflecting layers 4 each constituting a reflective display region 31 are each formed of an aluminum film or a silver alloy film, in the rectangular pixel region 3 where the first transparent electrode 11 and the second transparent electrode 21 are opposed, and a rectangular opening 40 is formed at the center of each of the light reflecting layers 4. As a result, in each of the pixel region 3, the region where the light reflecting layer 4 is formed constitutes the reflective display region 31, while the region corresponding to the opening 40 constitutes an insular and rectangular transmissive display region 32 where the light reflecting layer 4 is not formed.

Polarizers 41 and 42 are disposed on the outer surfaces of the first and second substrate 10 and 20, respectively, and a backlight device 7 is opposed to the polarizer 41 side. Also, on the first substrate 10, a reflective display color filter 81 and a transmissive display color filter 82 are formed in the each of the reflective display regions 31 and each of the transmissive display regions 32, respectively, thereby allowing color display.

In this embodiment, in the second substrate 20, on the lower layer side of the second transparent electrode 21, there are provided layer-thickness adjusting layers 6 each of which comprises a photoresist and in each of which a region corresponding to the transmissive display region 32 constitutes an opening 61. Therefore, in the transmissive display regions 32, since the layer thickness d of the liquid crystal layer 5 is larger than in the reflective display region 31 by the layer thickness of the layer-thickness adjusting layer 6, the retardation Δn·d is optimized for both the transmissive display light and the reflective display light.

Here, in each of the layer-thickness adjusting layers 6, an upwardly inclined surface 60 is formed in the boundary region of the reflective display region 31 and the transmissive display region 32 so as to have a width of 8 μm. Accordingly, in this embodiment, on the first substrate 10, light shielding films 9 are each formed into a rectangular frame shape so as to be superimposed over the entire boundary region of the reflective display region 31 and the transmissive display region 32. Each of the light shielding films 9 has a width of 9 μm, and is formed so that the inclined surface 60 is included in the light shielding film 9 in a plan view.

Accordingly, in this embodiment, since each of the light shielding films 9 is formed so as to be superimposed over the entire boundary region of the reflective display region 31 and the transmissive display region 32 as in the case of the first embodiment, it is possible to prevent a malfunction such as a light leakage in the boundary region of the reflective display region 31 and the transmissive display region 32, during black display. Thus, this embodiment produces the same effect as that of the first embodiment.

Meanwhile, in the above-described seventh embodiment, while the light shielding films 9 are each formed on the first substrate 10 side, the light shielding films 9 may be each formed on the second substrate 20 side as in the case of the fifth embodiment. In this case also, the same effect can be exerted.

Eighth Embodiment

Figure 8:
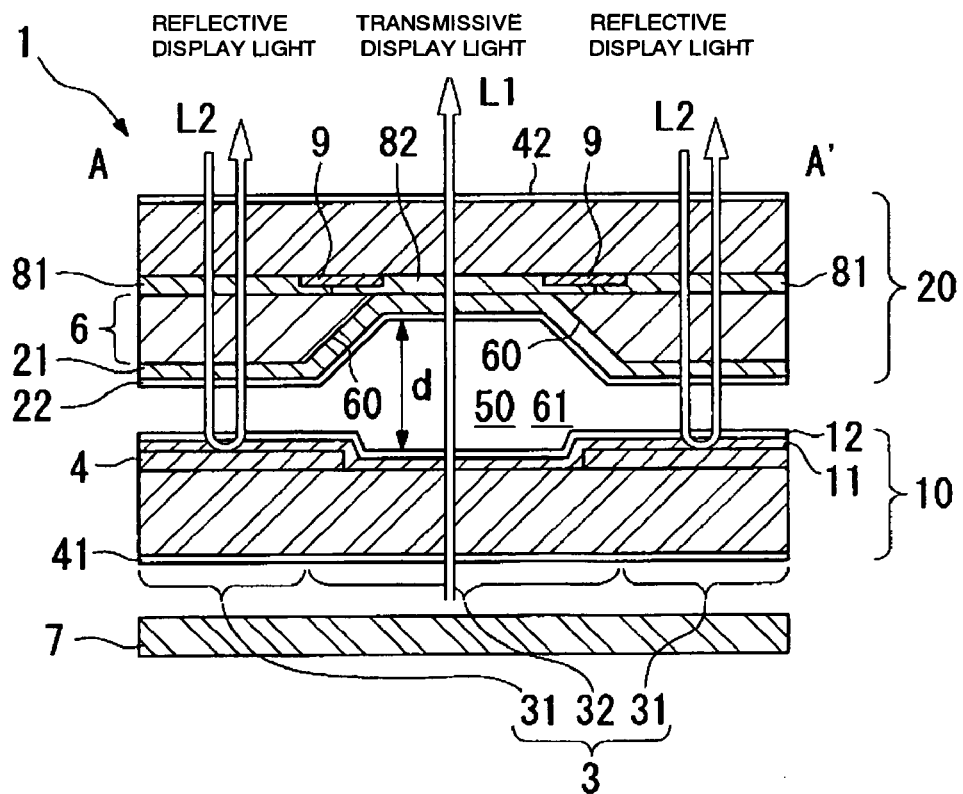
FIG. 8 is a sectional view showing a plurality of pixel regions formed into a matrix shape in a transflective liquid crystal device according to an eighth embodiment of the present invention, this sectional view corresponding to FIG. 1B.

The liquid crystal device of this embodiment is a modification in which the arrangement of the light shielding films 9 and the layer-thickness adjusting layers 6 according to the sixth embodiment has been modified. Since the plan view of the pixel region of this embodiment is the same as FIG. 1A, FIG. 1A is also used in this embodiment. Here, only an A–A' sectional view of this embodiment is illustrated in FIG. 8. The B–B' sectional view thereof is omitted from illustration since it is the same as FIG. 8. As in the case of the first embodiment, the pixel region shown in FIG. 8, shows the portion of an active matrix type liquid crystal device that is common to cases where either TFDs or TFTs are used as non-linear elements for pixel switching.

The liquid crystal device 1 illustrated here comprises a transparent first substrate 10 with pixel electrodes 11T and 11R formed on the surface thereof; a transparent second substrate 20 with second transparent electrodes formed on its surface side opposed to the first substrate 10; and a liquid crystal layer 50 including a TN mode liquid crystal held between the first substrate 10 and the second substrate 20. The regions where the pixel electrodes 11T and 11R and the second transparent electrodes 21 are mutually opposed constitute the pixel regions 3, which directly contribute to display. The pixel regions 3 are each in a state surrounded by the light shielding films 90 or light shielding wiring lines in a plan view, and are each disposed in the opening 40.

Here, the pixel electrodes formed on the first substrate 10 comprise light reflecting electrodes 11 R each constituted of an aluminum film or a silver alloy film and a first transparent electrodes 11T each constituted of an ITO film or the like. The light reflecting electrodes 11R are each formed in a rectangular frame shape along the outer periphery of the pixel region 3, and the first transparent electrodes 11T are each disposed inside the opening 40 at the central portion. In this embodiment, the arrangement is made such that each of the light reflecting layers also serves as a pixel electrode. As a result, in each of the pixel regions 3, the region where the light reflecting electrode 11R is formed constitutes the reflective display region 31, while the region corresponding to the opening 40 constitutes an insular and rectangular transmissive display region 32 where the light reflecting electrode 11R is not formed.

Polarizers 41 and 42 are disposed on the outer surfaces of the first and second substrate 10 and 20, respectively, and a backlight device 7 is opposed to the polarizer 41 side. Also, in this embodiment, on the second substrate 20, a reflective display color filter 81 and a transmissive display color filter 82 are formed in each of the reflective display regions 31 and each of the transmissive display regions 32, respectively, thereby allowing color display.

In this embodiment, in the second substrate 20, on the lower layer side of the second transparent electrode 21, and on the upper layer side of the color filter 81 and 82, there are provided layer-thickness adjusting layers 6 each of which comprises a photoresist and in each of which a region corresponding to the transmissive display region 32 constitutes an opening 61. Therefore, in the transmissive display region 32, since the layer thickness d of the liquid crystal layer 5 is larger than in the reflective display region 31 by the layer thickness of the layer-thickness adjusting layer 6, the retardation $\Delta n \cdot d$ is optimized for both the transmissive display light and the reflective display light.

Here, in each of the layer-thickness adjusting layers 6, an upwardly inclined surface 60 is formed in the boundary region of the reflective display region 31 and the transmissive display region 32 so as to have a width of 8 $\mu$m. Accordingly, in this embodiment, on the second substrate 20, light shielding films 9 are each formed into a rectangular shape so as to be superimposed over the entire boundary region of the reflective display region 31 and the transmissive display region 32. Each of the light shielding film 9 has a width of 9 $\mu$m, and is formed so that the inclined surface 60 is included in the light shielding film 9 in a plan view.

Accordingly, in this embodiment, since each of the light shielding films 9 is formed so as to be superimposed over the entire boundary region of the reflective display region 31 and the transmissive display region 32 as in the case of the first embodiment, it is possible to prevent a malfunction such as a light leakage in the boundary region of the reflective display region 31 and the transmissive display region 32, during black display. Thus, this embodiment produces the same effect as that of the first embodiment.

Meanwhile, in the above-described seventh embodiment, while the light shielding film 9 is formed on the first substrate 10 side, the light shielding film 9 may be formed on the second substrate 20 side as in the case of the fifth embodiment. In this case also, the same effect can be exerted.

Ninth Embodiment

Next, description will be made of the structure of a TFD active matrix type liquid crystal device in which a structure according to any one of the first to eighth embodiments is used.

Figure 9:
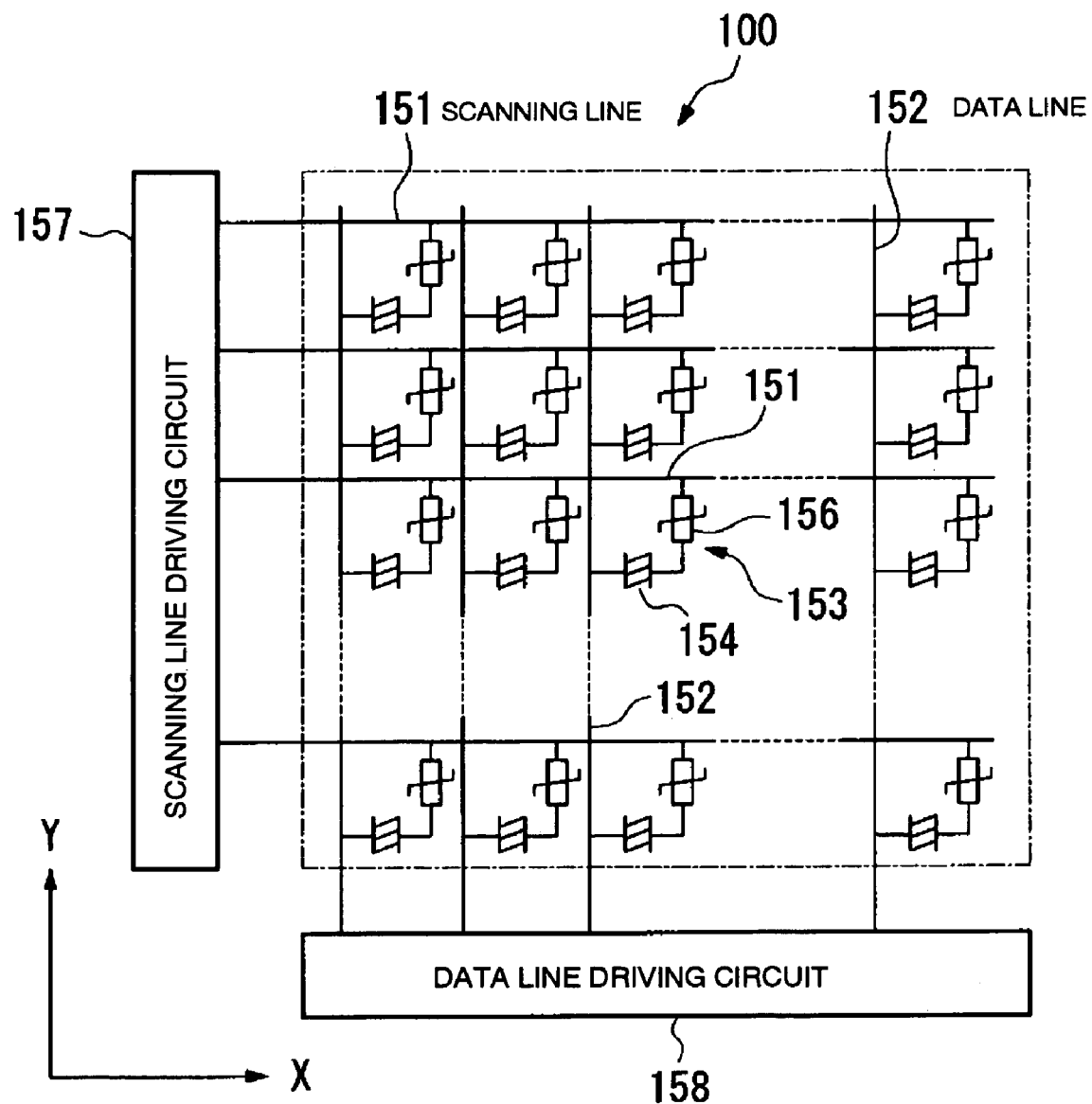
FIG. 9 is a block diagram schematically showing the electrical construction of a transflective TFD active matrix type liquid crystal device according to a ninth embodiment of the present invention.
Figure 10:
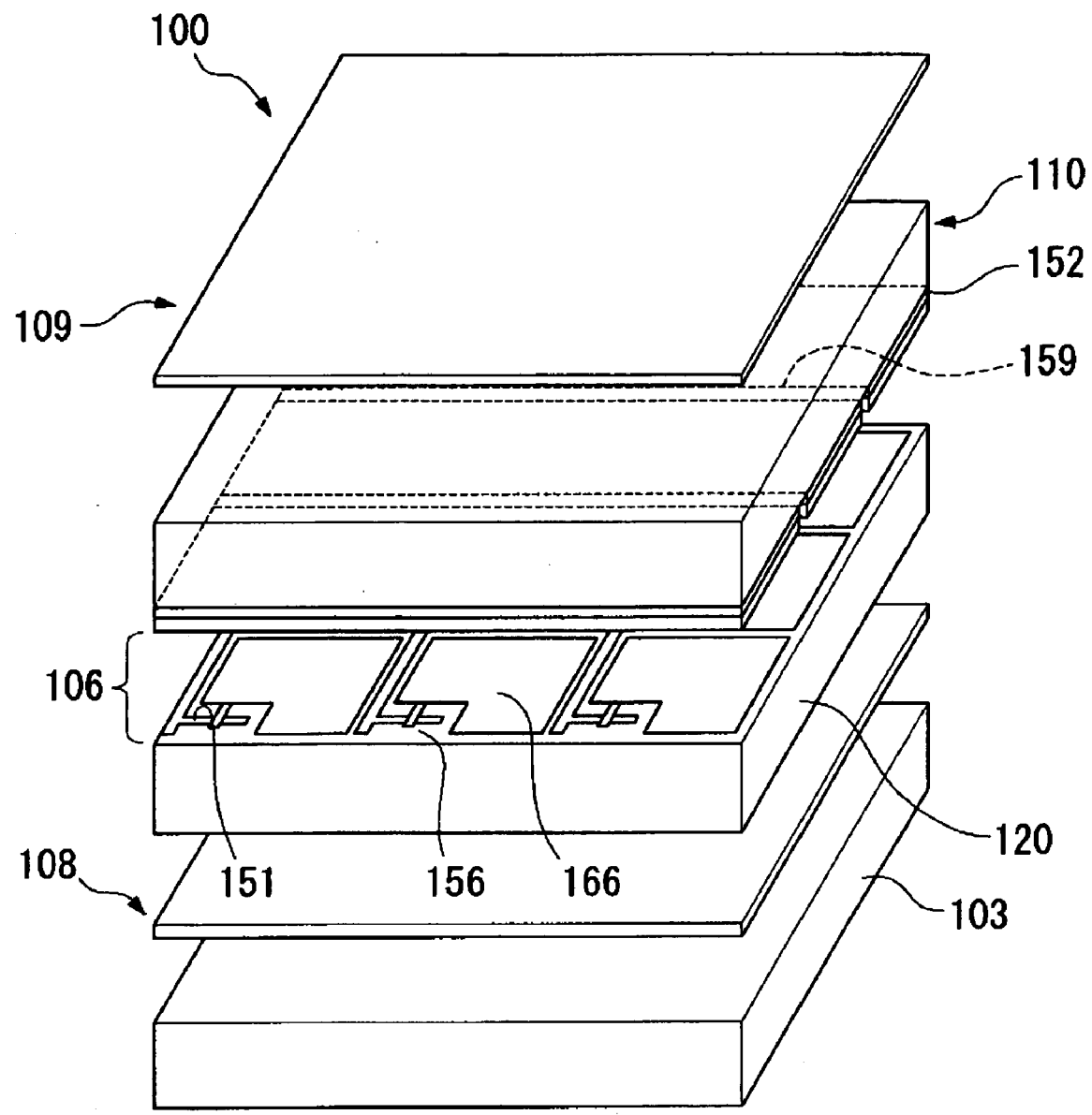
FIG. 10 is a schematic exploded view illustrating the structure of the liquid crystal device shown in FIG. 9.
Figure 11:
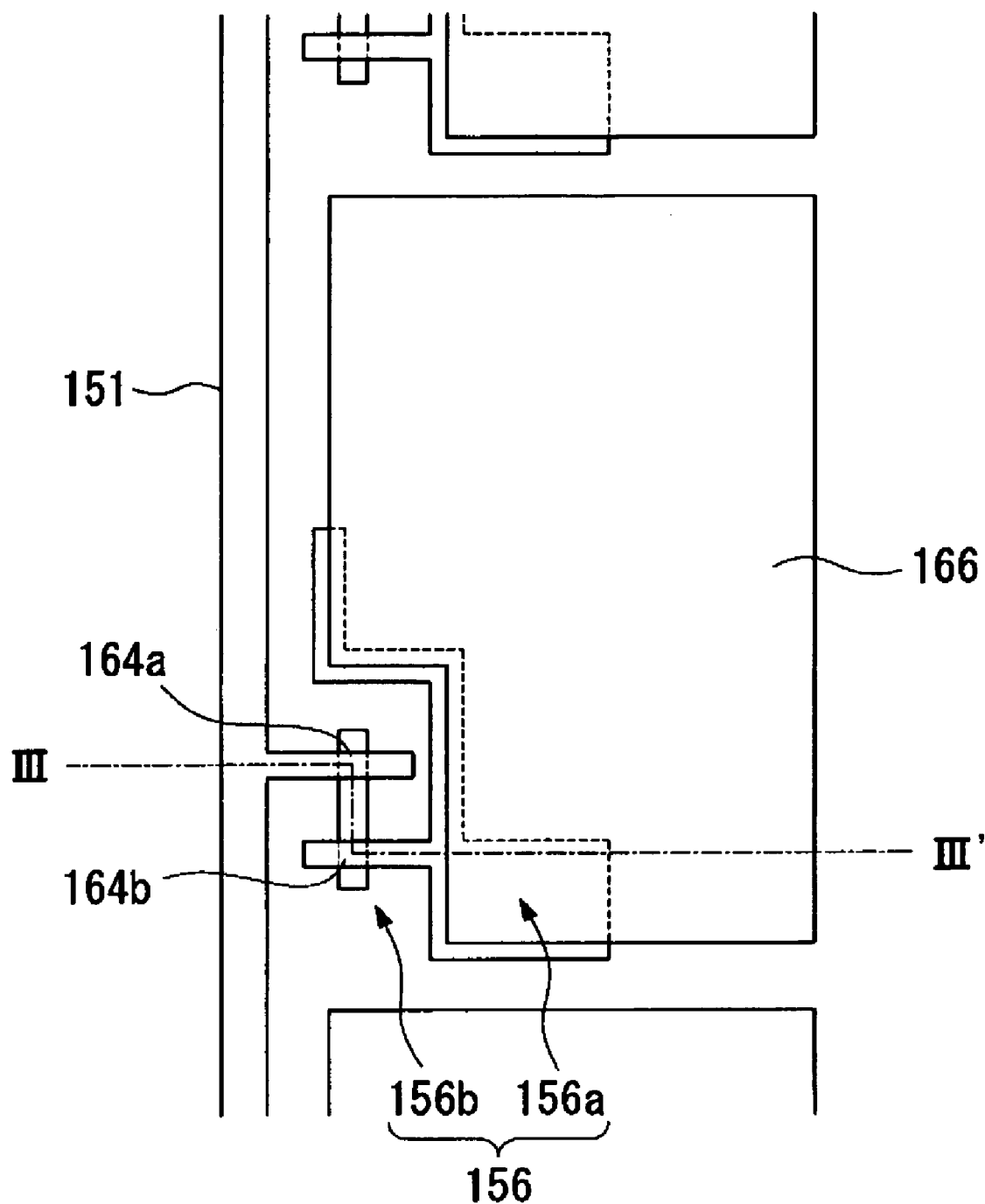
FIG. 11 is a plan view corresponding to a single pixel on an element substrate out of a pair of substrates sandwiching the liquid crystal therebetween in the liquid crystal device shown in FIG. 10.
Figure 12:
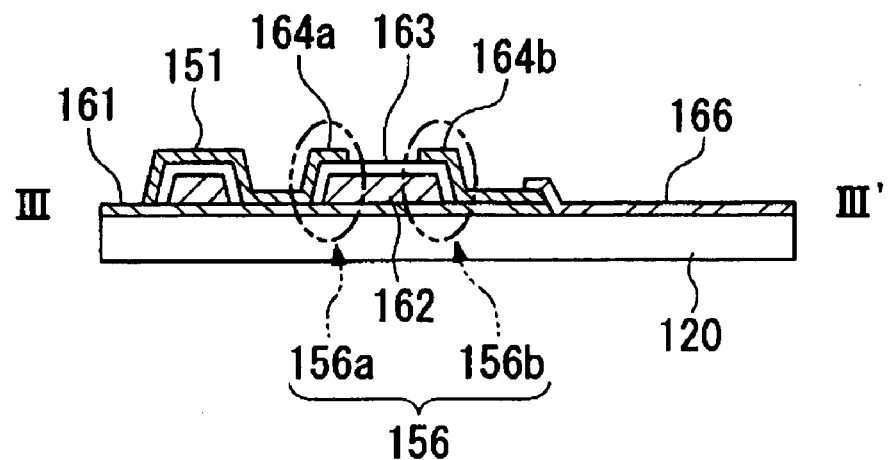
FIG. 12A is a sectional view taken along the line III–III' in FIG. 11.
FIG. 12B is a perspective view illustrating the TFD element shown in FIG. 11.
Figure 12:
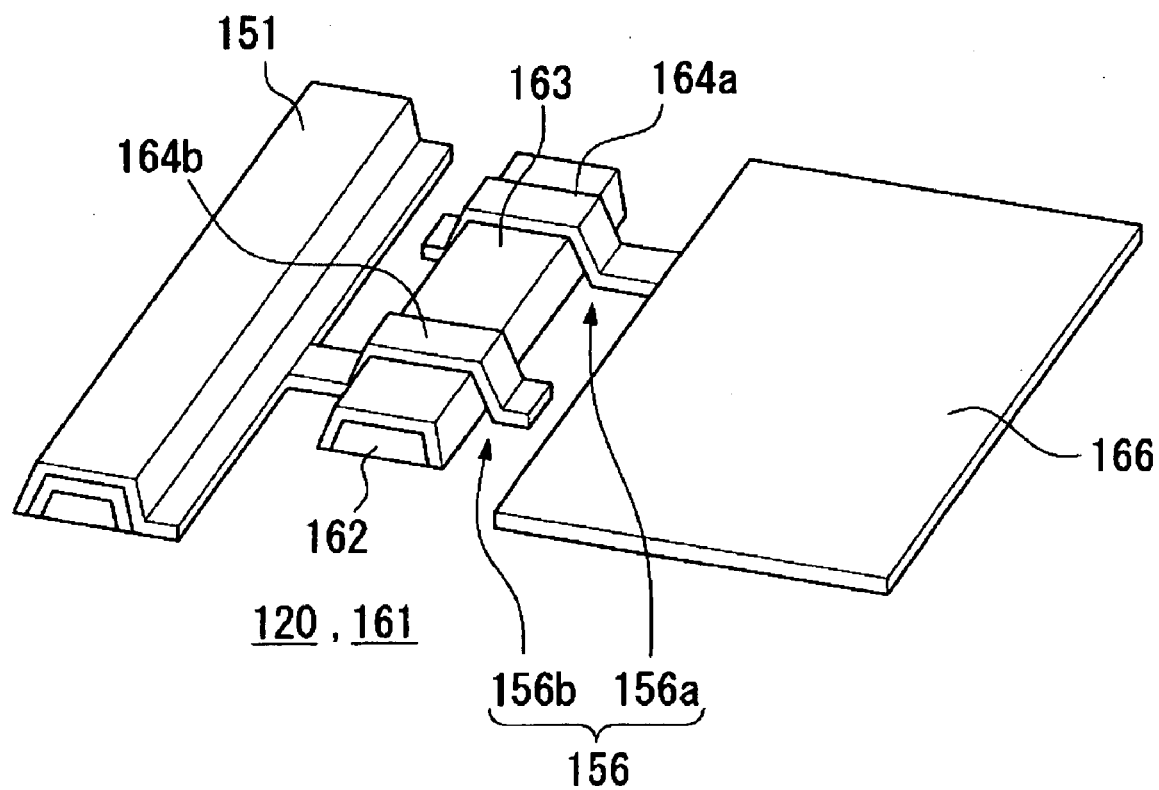

FIG. 9 is a block diagram showing the electrical configuration of the liquid crystal device. FIG. 10 is an exploded perspective view showing the structure of this liquid crystal device. FIG. 11 is a plan view corresponding to a single pixel on an element substrate out of a pair of substrates sandwiching the liquid crystal therebetween in the liquid crystal device. FIG. 12A is a sectional view taken along the line III–III' in FIG. 11, and FIG. 12B is a perspective view illustrating a TFD element formed in each pixel.

In the liquid crystal device 100 shown in FIG. 9, scanning lines 151 as a plurality of wiring lines are formed in the row direction (X-direction), and a plurality of data lines are formed in the column direction (Y-direction). A pixel 153 is formed at the position corresponding to each of the intersections between the scanning lines 151 and the data lines 152. In each of the pixels 153, a liquid crystal layer 154 and a pixel switching TFD element (non-linear element) 156 are connected in series. Each of the scanning lines is driven by a scanning line driving circuit 157, and each of the data lines is driven by a data line driving circuit 158.

As shown in FIG. 10, in the active matrix type liquid crystal device 100 with this arrangement, on an element substrate 120 out of a pair of transparent substrates holding a liquid crystal 106, a plurality of scanning lines extends, and each pixel electrode 166 is electrically connected to one of the scanning lines 151 through one of the TFD element 156. On the other hand, on an opposing substrate 110, plural columns of band-shaped data lines 152 that extend in the direction intersecting the scanning line 151 on the element substrate 120, are each formed of an ITO film. Light shielding films 159 referred to as "black stripes" are formed between data lines. Each of the pixel electrodes 166, therefore, is in a state surrounded by light shielding films 159 and scanning lines 151 in a plan view.

An ordinary TN mode crystal liquid 106 is used as a liquid crystal 106. Since this type of liquid crystal 106 performs an optical modulation by changing the polarization direction of light, polarizers 108 and 109 are disposed so as to be overlaid on the outer surfaces of the element substrate 120 and the opposing substrate 110, respectively. Also, a backlight device 103 is opposed to the polarizer 108 side.

In the example shown here, the scanning lines 151 have been formed on the element substrate 120, and the data lines 152 have been formed on the opposing substrate 110. Alternatively, however, the scanning lines 151 may be formed on the opposing substrate 110, and the data lines 152 may be formed on the element substrate 110.

As shown in FIG. 11 and FIGS. 12A and 12B, the TFD element 156 is formed, for example, as a so-called "back-to-back" structure by two TFD element components that comprise a first TFD element 156a and a second TFD element 156b, and that are formed on a foundation layer 161 deposited on the surface of the element substrate 120. Thereby, in the TFD element 156, the non-linearity between current and voltage is symmetrized in both positive and negative directions. The foundation layer 161 comprises, for example, tantalum oxide (Ta2O5) with a thickness of about 50 to 200 nm.

The first TFD element 156a and the second TFD element 156b both have a first metallic film 162, an insulating film 163 formed on the first metallic film 162, and have respective second metallic films 164a and 164b formed in a spaced apart manner on the surface of the insulating film 163. The first metallic film 162 is formed of, for example, a single substance film of Ta (tantalum) with a thickness of about 100 to 500 nm, or a Ta alloy film such as a Ta-W (tantalum-tungsten) alloy film. The insulating film 163 is constituted of, for example, tantalum oxide (Ta2O5) with a thickness of 10 to 35 nm formed by oxidizing the surface of the first metallic film 62 by an anodic oxidation method.

The second metallic films 164a and 164b are each formed of a light shielding metallic film, such as a Cr (chrome) film with a thickness of about 50 to 300 nm. The second metallic film 164a constitutes a scanning line 151 as it is, while the second metallic film 164b is connected to the pixel electrode 166, which comprises an ITO film or the like.

In the liquid crystal device 100 arranged in this way, each region where the pixel electrode 166 and the data line 152 are mutually opposed constitutes the pixel region 3, which has been described in the first to eighth embodiments. Therefore, the element substrate 120, the opposing substrate 110, the pixel electrode 166, and the data line 152 correspond to the first substrate 10, the second substrate 20, the first electrode 11, and the second electrode 21 in the first to eighth embodiments, respectively. Thus, it proves that, on the lower layer side of the pixel electrode 166, the light reflecting layer 4, the light shielding film 9, the reflective display color filter 81, the transmissive display color filter 82, and the layer-thickness adjusting layer 6, which have been described with reference to FIGS. 1 to 4, are formed.

Here, when the arrangement described in the fourth embodiment is to be applied to the liquid crystal device 100, each of the pixel electrodes 166 is formed so as to straddle the scanning line 151, and one of opposite sides of the scanning line 151 is used as a reflective display region 31, while the other side thereof is used as a transmissive display region 32. Thereby, the scanning line 151 is formed along the boundary region of the reflective display region 31 and the transmissive display region 32. Thus, the scanning line 151 can be utilized as the light shielding film shown in FIG. 4.

Also, in the liquid crystal device 100, the element substrate 120, the opposing substrate 110, the pixel electrode 166, and the data line 152 may be used as the second substrate 20, the first substrate 10, the second electrode 21, and the first electrode 11 in the first to eighth embodiments, respectively. In this case, it proves that, on the lower layer side of the data line 152, the light reflecting layer 4, the light shielding film 9, the reflective display color filter 81, the transmissive display color filter 82, and the layer-thickness adjusting layer 6, which have been described with reference to FIGS. 1 to 4, are formed, and that a backlight device 163 is opposed to the opposing substrate 200.

Tenth Embodiment

Next, description will be made of the structure of a TFT active matrix type liquid crystal device in which a structure according to any one of the first to eighth embodiments is used.

Figure 13:
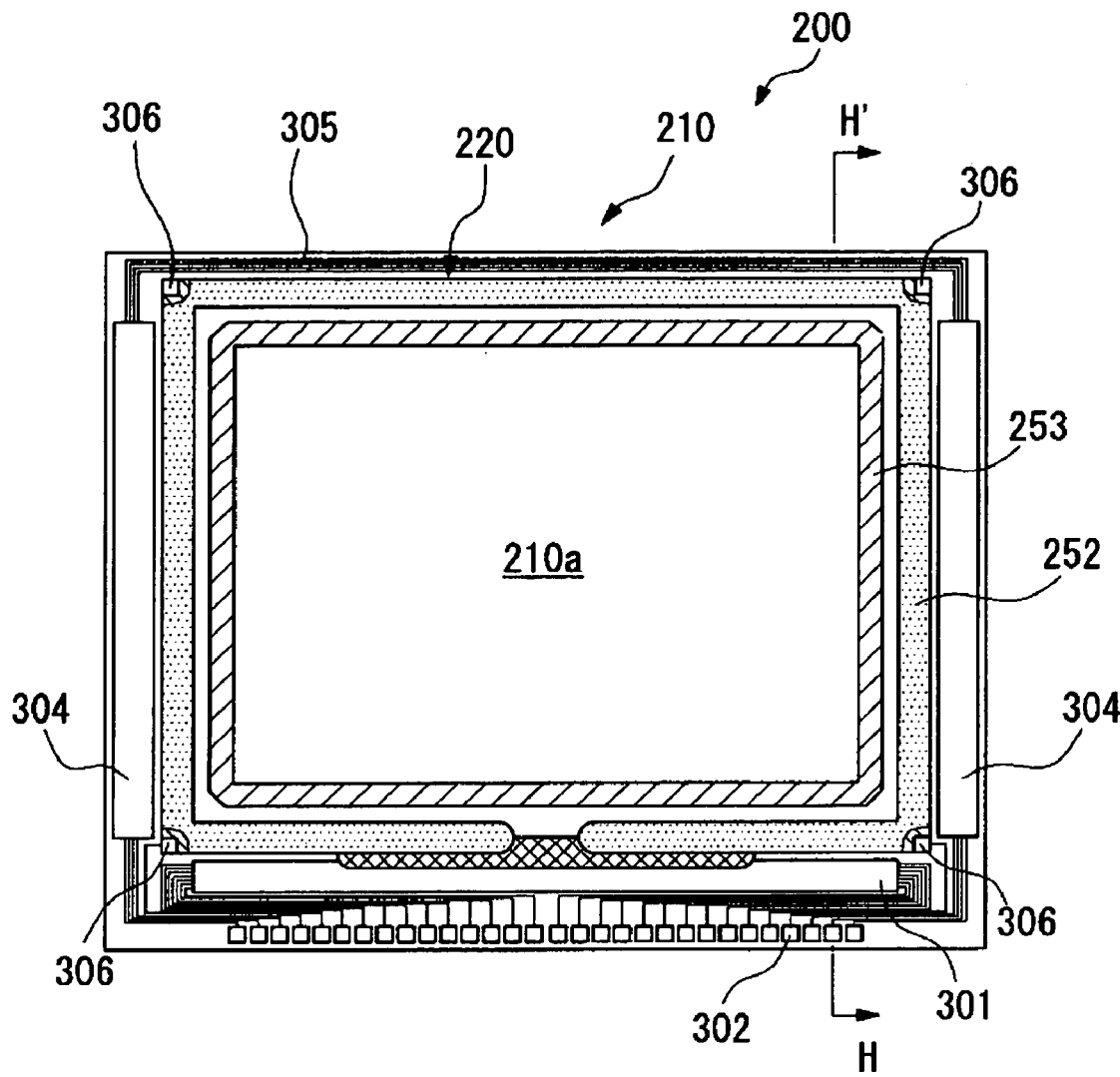
FIG. 13 is a plan view showing a transflective TFT active matrix type liquid crystal device according to a tenth embodiment of the present invention, as seen from the side of an opposed substrate.
Figure 14:
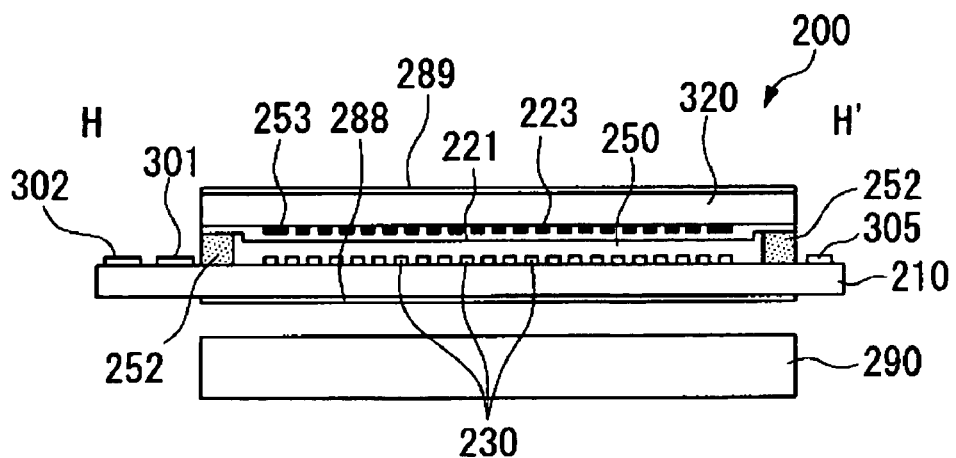
FIG. 14 is a sectional view taken along the line H–H' in FIG. 13.
Figure 15:
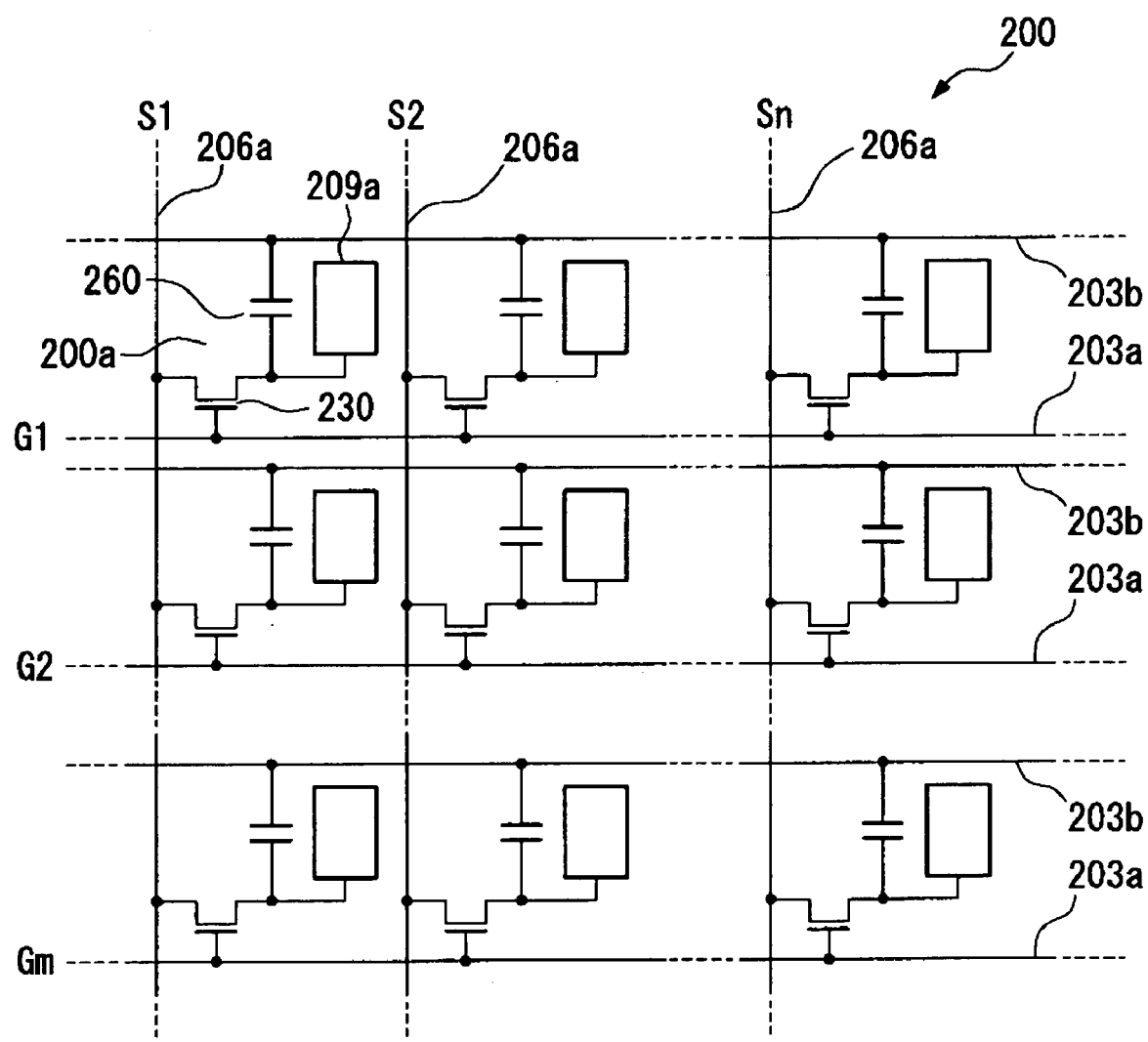
FIG. 15 is an equivalent circuit diagram of various elements and wiring lines formed on a plurality of pixels arranged in a matrix shape in the liquid crystal device shown in FIG. 13.

FIG. 13 is a plan view showing the TFT active matrix type liquid crystal device and the components thereof, as viewed from the opposing substrate side, and FIG. 14 is a representation showing the H–H' section in FIG. 13. FIG. 15 is an equivalent circuit diagram of various elements and wiring lines formed on a plurality of pixels formed into a matrix shape in the image display region in the liquid crystal device.

As shown in FIGS. 13 and 14, in the liquid crystal device 200 of this embodiment, a TFT array substrate 210 and an opposing substrate 220 are bonded together with a seal material 252, and a liquid crystal 250 as an electro-optical substance is held in a region (liquid crystal enclosing region) defined by the seal material 252. Polarizers 288 and 289 are disposed on the TFT array substrate 210 and the opposing substrate 220, respectively, and a backlight device 290 is opposed to the polarizer 288 side.

On the inside area of the forming region of the seal material 252, a peripheral partition 252 comprising a light shielding material is formed. On the outside area of the seal material 252, a data line driving circuit 301 and mounting terminals 302 are formed along one side of the TFT array substrate 210, and a scanning line driving circuit 304 is formed along the two sides adjacent to the aforementioned one side. Along the remaining one side of the TFT array substrate 210, there is provided a plurality of wiring lines 305 for interconnecting the scanning line driving circuits 304 provided on the opposite sides of the image display area 210a. Furthermore, in some case, a precharge circuit and/or an inspection circuit are provided making use of the space below the peripheral partition 253. Also, at least one place in a corner portion of the opposing substrate 220, an inter-substrate conductive material 306 is formed for establishing an electrical conduction between the TFT array substrate 210 and the opposing substrate 220.

Instead of forming the data line driving circuit 301 and the scanning line driving circuits 304 on the TFT array substrate 210, for example, a TAB (Tape Automated Bonding) substrate on which LSIs for drive are mounted, may be electrically and mechanically connected to a group of terminals formed on the periphery of the TFT array substrate 210 through an anisotropic conductive film. Meanwhile, the liquid crystal 50 is used in the TN mode also in the liquid crystal device 200 of this embodiment.

As shown in FIG. 15, in the image display region 210a of the liquid crystal device 200 with this arrangement, a plurality of pixels 200a is formed into a matrix shape. In each of these pixels 200a, a pixel electrode 209a and a pixel-switching TFT 230 for driving the pixel electrode are formed, and a data line 206a for supplying pixel signals S1, S2 . . . , Sn is electrically connected to the source of the TFT 230. The pixel signals S1, S2 . . . , Sn written into the data lines 206a may be line-sequentially supplied in this order, or alternatively they may be supplied for every group of the plurality of mutually adjacent data lines 206a. Also, scanning lines 203a are electrically connected to the gate of each of the TFTs 230, and at a predetermined timing, scanning signals G1, G2 . . . , Gm in the form of pulses are line-sequentially applied to the scanning lines 203a in this order. The pixel electrodes 209a are electrically connected to the drain of each of the TFTs 230a, and each of the TFTs 230 as a switching element is kept in its ON state during a definite time period so as to write pixel signals S1, S2 . . . , Sn supplied from the data line 206a into each pixel at a predetermined timing. In this manner, the pixel signals S1, S2 . . . , Sn of a predetermined level, which have been written to the liquid crystal via the pixel electrode 209a, are held for a definite time period between the pixel electrodes 209a and an opposing electrode 221 formed on the opposing substrate 220 shown in FIG. 14.

The liquid crystal 250 modulates light by the variation in the orientation and the order of the molecular aggregation thereof according to the level of an applied voltage, thereby making it possible to provide grayshade display. In the normally white mode, the amount of incident light passing through the liquid crystal 250 portion decreases according to the level of an applied voltage, whereas in the normally black mode, the amount of incident light passing through the liquid crystal 250 portion increases according to the level of an applied voltage. Consequently, light having contrast according to the pixel signals S1, S2 . . . , Sn is emitted from the liquid crystal device 200, as a whole.

In order to inhibit the held pixel signals S1, S2 . . . , Sn from leaking, a storage capacitor 260 may be added thereto in parallel with a liquid crystal capacitor formed between the pixel electrode 209a and the opposing electrode. For example, the voltage of the pixel electrode 209a is held by the storage capacitor 260 for a time period longer by three orders of magnitude than the time period during which a source voltage is applied to the pixel electrode 209a. This improves the electric charge holding characteristic, thereby making it possible to achieve a liquid crystal device 200 having a high contrast ratio. Meanwhile, with regard to the formation of the storage capacitor 260, as illustrated in FIG. 15, the storage capacitor 260 may be formed between the pixel electrode 209a and a capacitor line 203b, which is a wiring line for forming the storage capacitor 260, or alternatively it can be formed between the pixel electrode 209a and a pre-stage scanning line 203a.

Figure 16:
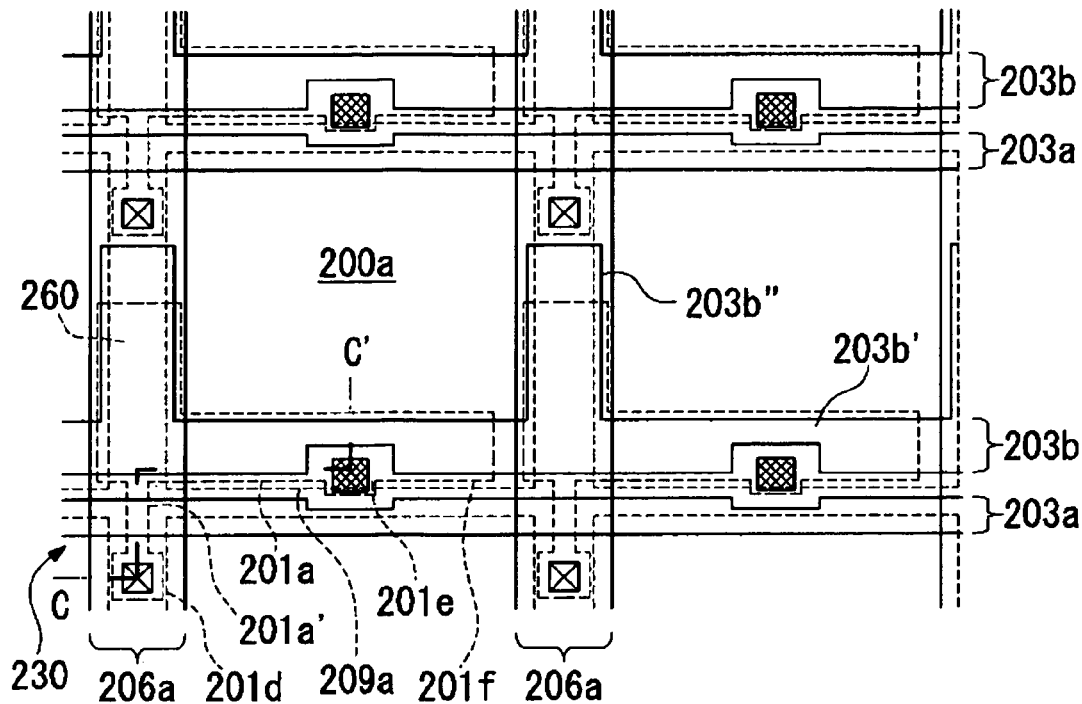
FIG. 16A is a plan view illustrating the configurations of pixels formed on a TFT array substrate to which the arrangement according to any one of the embodiments 1 to 3, or 5 to 8 has been applied, in the liquid crystal device shown in FIG. 13.
FIG. 16B is a plan view illustrating the configurations of pixels formed on a TFT array substrate to which the arrangement according to the embodiment 4 has been applied.
Figure 16:
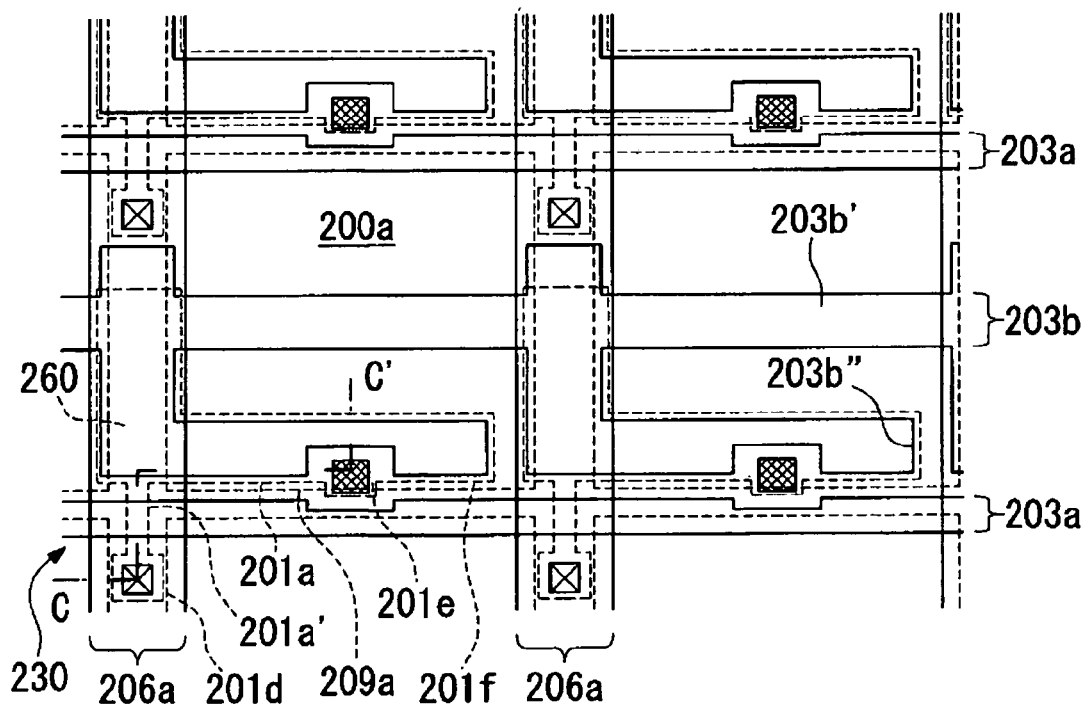
Figure 17:
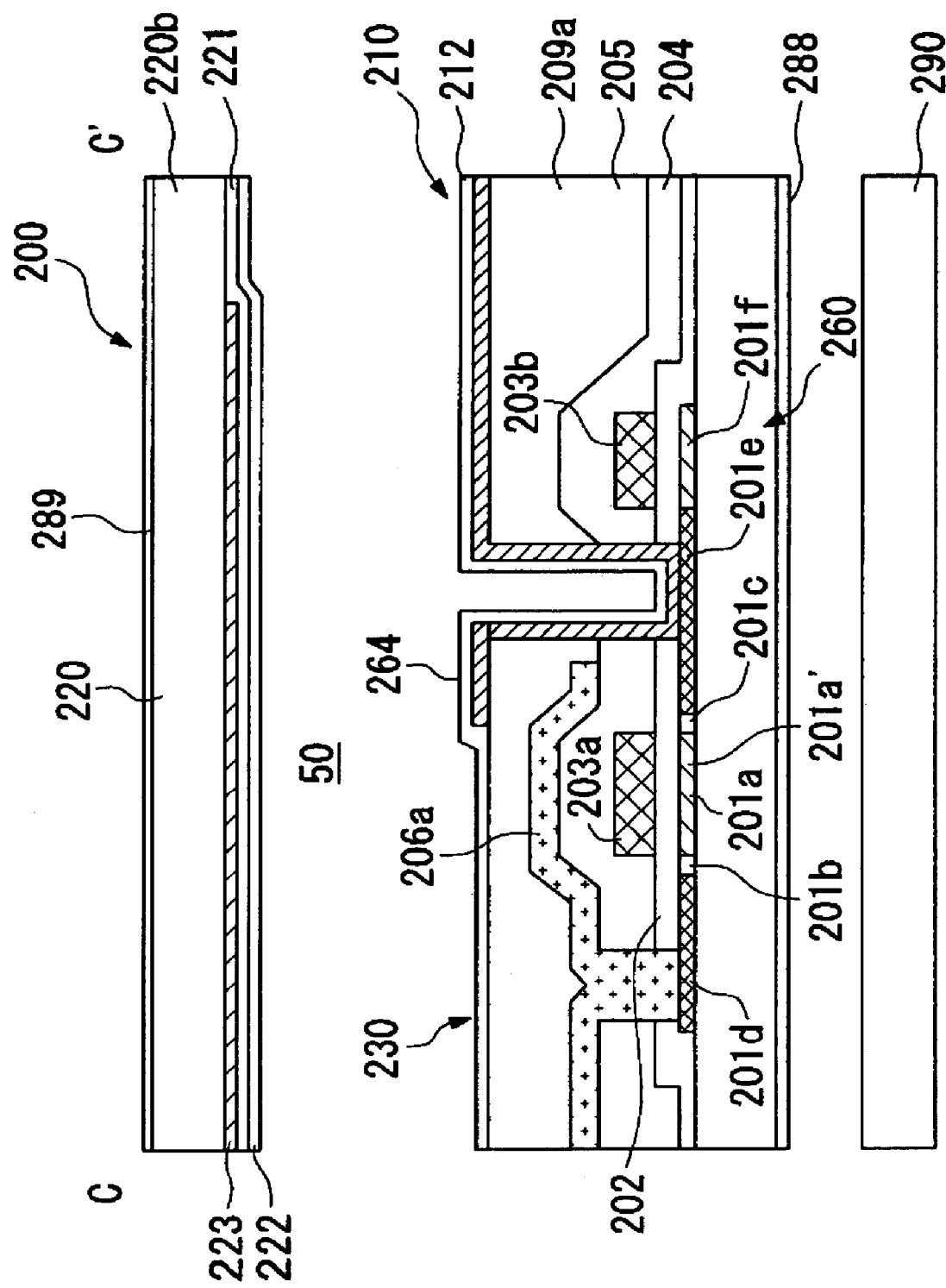
FIG. 17 is a sectional view showing some of the pixels of the liquid crystal device shown in FIG. 13, the sectional view being obtained by cutting them at the position corresponding to the line C–C' shown in FIGS. 16A and 16B.

FIG. 16A is a plan view illustrating the configuration of pixels formed on a TFT array substrate to which an arrangement according to any one of the embodiments 1 to 3, or 5 to 8 has been applied, in the liquid crystal device shown in FIG. 13, and FIG. 16B is a plan view illustrating the configuration of pixels formed on a TFT array substrate to which the arrangement according to the embodiment 4 has been applied. FIG. 17 is a sectional view showing some of the pixels of the liquid crystal device according to this embodiment, the sectional view being obtained by cutting them at the position corresponding to the line C–C' shown in FIGS. 16A and 16B.

As shown in FIG. 16A, in the liquid crystal device shown in FIG. 13, when a structure according to any one of the embodiments 1 to 3, or 5 to 8 has been applied, a plurality of pixel electrodes 209a each comprising a transparent ITO film is formed into a matrix shape, and a pixel switching TFT 230 is connected to each of the pixel electrodes 209a. Data lines 206a, scanning lines 203a, and capacitor lines 203b are formed along the longitudinal and lateral boundaries of the pixel electrodes 209a, and each of the TFTs 230 is connected to the data line 206a and the scanning line 203a. Specifically, each of the data lines 206a is electrically connected to a high-concentration source region 201d of the TFT 230 through a contact hole, and each of the pixel electrodes 209a is electrically connected to a high-concentration drain region 201e of the TFT 230 through a contact hole. Each of scanning lines 203a extends so as to be opposed to a channel region 201' of the TFT 230. Here, the storage capacitors 260 each have a structure in which the extending portion 201f of the semiconductor film 201 for forming the pixel switching TFT 230 is used as a lower electrode after having been made conductive, and in which the capacitor line 203b in the same layer as the scanning line 203a is opposed to the aforementioned lower electrode 241, as an upper electrode.

The capacitor line 203b comprises a main line portion 203b' that extends along the scanning line 203a in the vicinity thereof, and a projecting portion 203b" that projects from the main line portion 203' along the data line 206a.

However, when the arrangement according to the fourth embodiment is applied to the liquid crystal device shown in FIG. 13, the capacitor line 203a comprises, as shown in FIG. 16B, a main line portion 203b' that extends along the scanning line 203a from the substantially intermediate position of two adjacent scanning lines 203a, and a projecting portion 203b" that, after having projected from the main line portion 203b' along the data line 206a, extends along the scanning line 203a in the vicinity thereof. In this case, by using one of opposite sides of the main portion 203' of the capacitor line 203b as the reflective region 31, and using the other of the opposite sides as the transmissive region 32, a capacitor line 203b is formed along the boundary region thereof. The main line portion 203b' of the capacitor line 203B, therefore, can be utilized as the light shielding film 9 shown in FIG. 4.

In the liquid crystal device 200 arranged in this way, an insular semiconductor film 201a with a thickness of 50 to 100 nm is formed on the surface of the TFT array substrate 210. A gate insulating film 202 constituted of a silicon oxide film with a thickness of 50 to 150 nm is formed on the surface of the semiconductor film 201. The scanning line 203a with a thickness of 300 to 800 nm runs on the surface of the gate insulating film 202, as a gate electrode. Out of the semiconductor film 201a, the region that is opposed to the scanning line 203a with the gate insulating film 202 therebetween, constitutes a channel region 201a'. With respect to this channel region 201a', a source region that includes a low-concentration source region 201b and a high-concentration source region 201d is formed on one side, and a drain region that includes a low-concentration drain region 201c and a high-concentration drain region 201e is formed on the other side.

On the surface side of the pixel switching TFT 230, there are provided a first inter-layer insulating film 204 constituted of silicon oxide film with a thickness of 300 to 800 nm and a second inter-layer insulating film 205 constituted of silicon nitride film with a thickness of 100 to 300 nm. A data line 206a with a thickness of 300 to 800 nm is formed on the surface of the first interlayer insulating film 204, and is electrically connected to the high-concentration source region 201d through a contact hole formed in the first interlayer insulating film 204.

A pixel electrode 209a comprising an ITO film is formed on the upper layer of the second inter-layer insulating film 205. The pixel electrode 209a is electrically connected to the drain electrode 206b through a contact hole formed in the second inter-layer insulating film 205. An alignment film 212 constituted of a polyimide film is formed on the surface side of the pixel electrode 209a. The alignment film 212 is a film obtained by applying a rubbing treatment to the polyimide film.

The storage capacitor 260 is constituted by opposing the capacitor line 203b in the same layer as the scanning line 203a as the upper electrode, to the extending portion 201f (lower electrode) from the high-concentration drain region 201e, with an insulating film (dielectric film) formed simultaneously with the gate insulating film 202 interposed therebetween.

The TFT 230 preferably has an LDD (Lightly Doped Drain) structure as described above. Alternatively, however, the TFT 230 may have an offset structure in which impurity ion implantation is not applied to regions corresponding to the low-concentration source region 201b and the low-concentration drain region 201c. Furthermore, alternatively, the TFT 230 may be a self-alignment type TFT in which impurity ion implantation is performed at a high concentration with a gate electrode (a portion of the scanning line 203a) as a mask, and high-concentration source and drain areas are formed in a self-alignment manner.

In this embodiment, a single gate structure is adopted in which only one gate electrode (scanning line 203a) of the TFT 230 is disposed between the high-concentration source region and the high-concentration drain region. However, two or more gate electrodes may be disposed between these regions. In this case, the same signal should be applied to these gate electrodes. In this manner, by forming the TFT 230 with dual, triple, or more multiple gates as described above, leaking currents can be prevented at a channel and the connecting portion between a channel and the source/drain regions, thus reducing currents during power-off. By arranging at least one of these gate electrodes to have the LDD structure or the offset structure, it is possible to further reduce off-currents and to form a stable switching element.

As shown in FIG. 17, on the opposing substrate 220, a light shielding film 223 referred to as a "black matrix" or a "black stripe" is formed in the region opposed to the longitudinal and lateral boundary regions of the pixel electrode 209a formed on the TFT array substrate 210, and an opposing electrode 221 comprising an ITO film is formed on the upper layer side of the light shielding film 223. Also, an alignment film 222 constituted of a polyimide film is formed on the upper layer side of the opposing electrode 221. This alignment film 222 is a film obtained by applying a rubbing treatment to the polyimide film.

In the liquid crystal device 200 arranged in this manner, the region where the pixel electrode 209a and the opposing electrode 221 are mutually opposed, corresponds to the pixel region described in the first to eighth embodiments. Therefore, the TFT array substrate 210, the opposing substrate 220, the pixel electrode 209a, and the opposing electrode 221 correspond to the first substrate 10, the second substrate 20, the first electrode 11, and the second electrode 21 in the first to eighth embodiments, respectively. In this case, it proves that, on the lower layer side of the pixel electrode 209a, there are provided the light reflecting layer 4, the light shielding film 9, the reflective display color filter 81, the transmissive display color filter 82, and the layer-thickness adjusting layer 6, which have been described with reference to FIGS. 1 to 8.

Alternatively, in the liquid crystal device 200, the TFT array substrate 210, the opposing substrate 220, the pixel electrode 209a, and the opposing electrode 221 may be used as the second substrate 20, the first substrate 10, the second electrode 21, and the first electrode 11 in the first to eighth embodiments, respectively. In this case, it proves that, on the lower layer side of the opposing electrode 221, there are provided the light reflecting layer 4, the light shielding film 9, the reflective display color filter 81, the transmissive display color filter 82, and the layer-thickness adjusting layer 6, which have been described with reference to FIGS. 1 to 8, are formed, and that a backlight device 290 is opposed to the opposing substrate 200.

Application of Liquid Crystal Device to Electronic Device

The transflective liquid crystal device arranged in this manner can be used as a display for various electronic devices. An example thereof will be described with reference to FIGS. 18 to 20.

Figure 18:
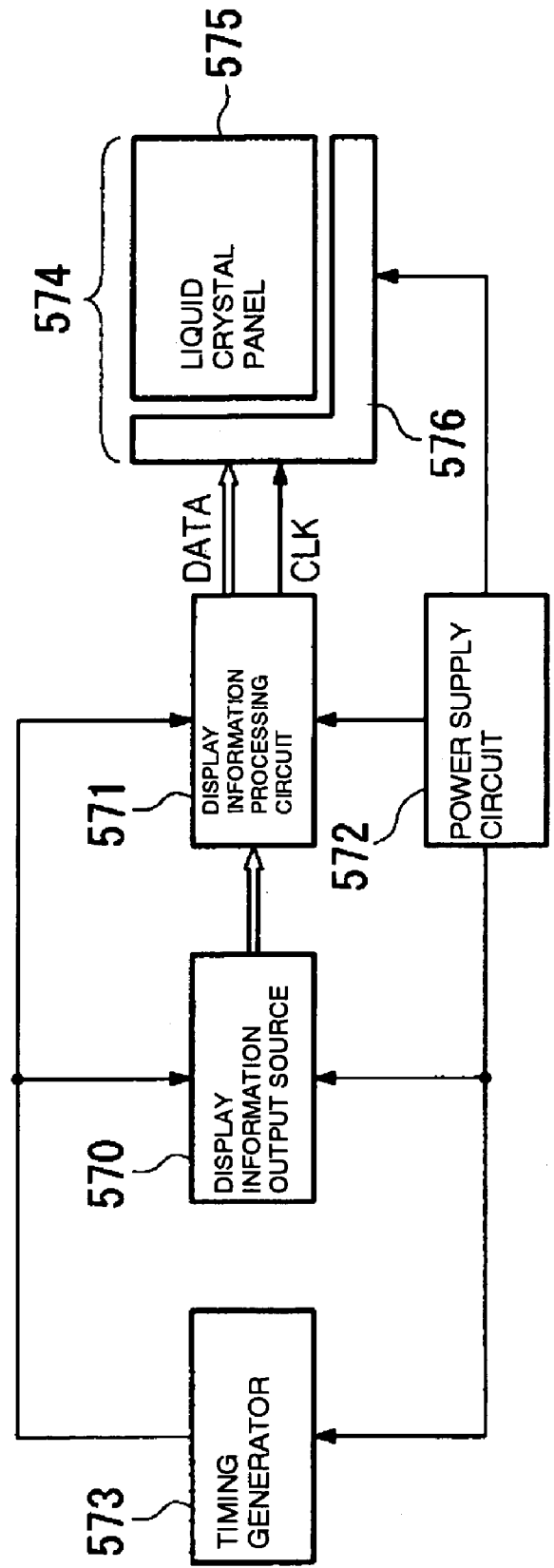
FIG. 18 is a block diagram showing the circuit configuration of an electronic device in which a liquid crystal device according to the present invention is used as a display.

FIG. 18 is a block diagram showing the circuit configuration of an electronic device in which a liquid crystal device according to the present invention is used as a display.

In FIG. 18, the electronic device comprises a display information output source 570, a display information processing circuit 571, a power supply circuit 572, a timing generator 573, and a liquid crystal device 574. The liquid crystal device 574 has a liquid crystal display panel 575 and a drive circuit 576. As the liquid crystal device 574, any one of the liquid crystal devices 1, 100, and 200 to which the present invention has been applied, can be used.

The display information output source 570 comprises memories such as a ROM (Read Only Memory and a RAM (Random Access Memory), storage units including various disks, and a synchronization circuit that outputs digital image signals in synchronization. The display information output source 570 supplies the display information processing circuit 571 with display information such as image signals of a predetermined format in response to various clock signals produced by the timing generator 573.

The display information processing circuit 571 comprises various known circuits such as a serial-parallel conversion circuit, an amplification/polarity reversing circuit, a rotation circuit, a gamma correction circuit, and a clamp circuit. The display information processing circuit 571 processes display information that has been inputted, and supplies the generated image signals together with a clock signal CLK to the drive circuit 576. The power supply circuit 572 supplies a predetermined voltage to the individual components.

Figure 19:
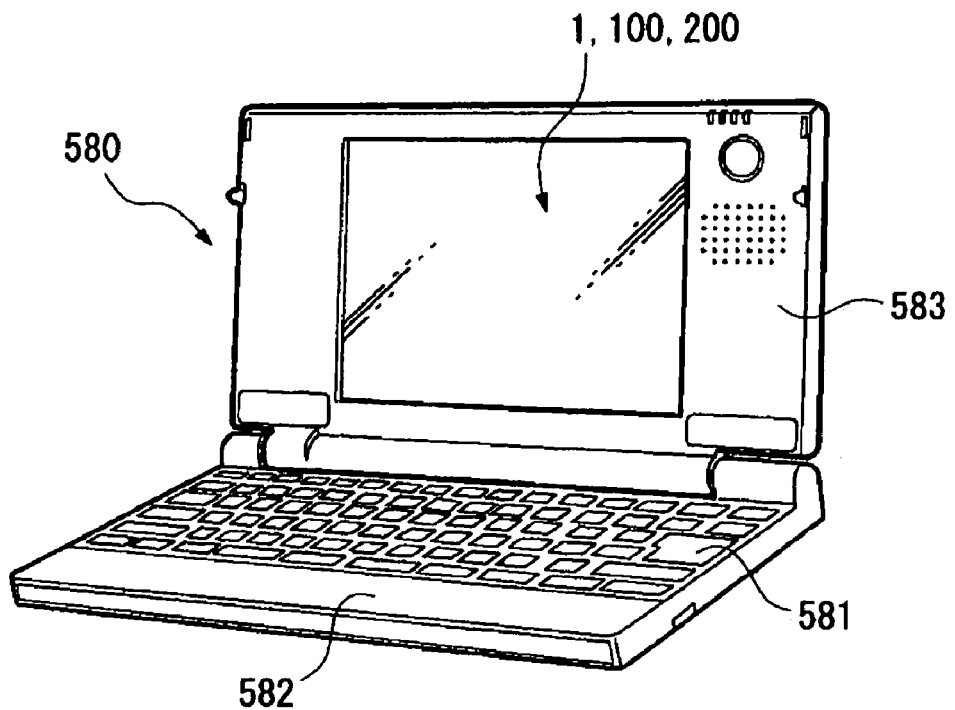
FIG. 19 is a representation of a mobile personal computer as an embodiment of an electronic device using a liquid crystal device according to the present invention.

FIG. 19 show a mobile personal computer as an embodiment of an electronic device according to the present invention. The illustrated personal computer 580 comprises a main body portion 582 equipped with a keyboard 581, and a liquid crystal display unit 583. The liquid crystal display unit 583 is arranged to include any one of the liquid crystal devices 1, 100, and 200 to which the present invention has been applied.

Figure 20:
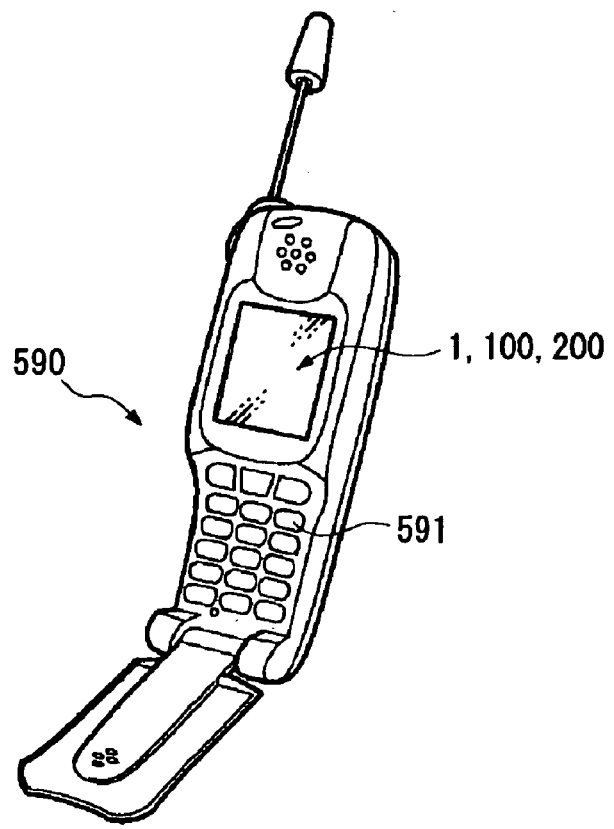
FIG. 20 is a representation of a portable telephone as an embodiment of an electronic device using a liquid crystal device according to the present invention.
Figure 21:
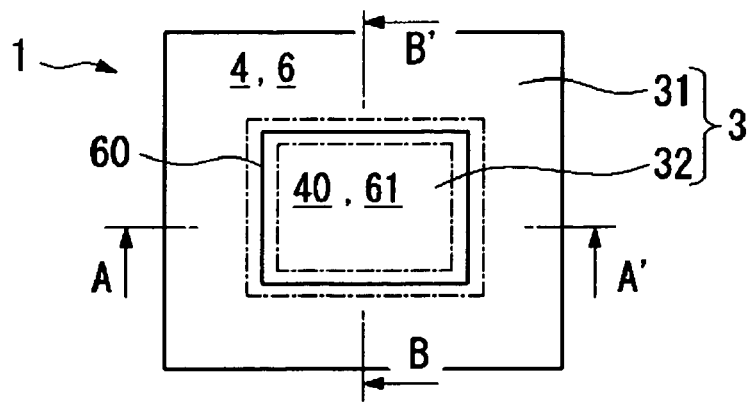
FIGS. 21A to 21C are schematic views showing a single pixel region of a plurality of pixel regions formed into a matrix shape in a related transflective liquid crystal device, where
Figure 21:
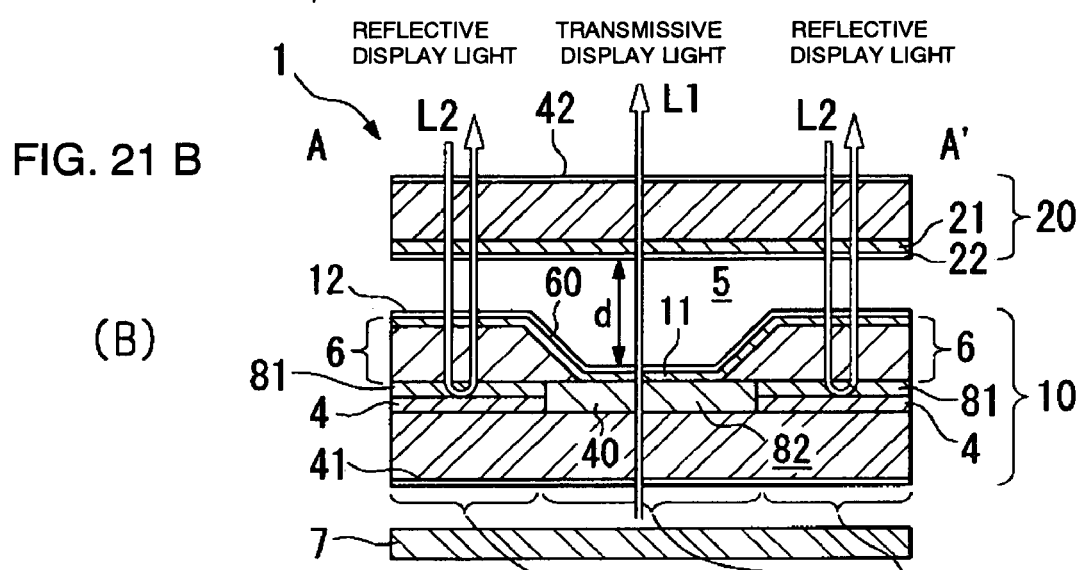
Figure 21:
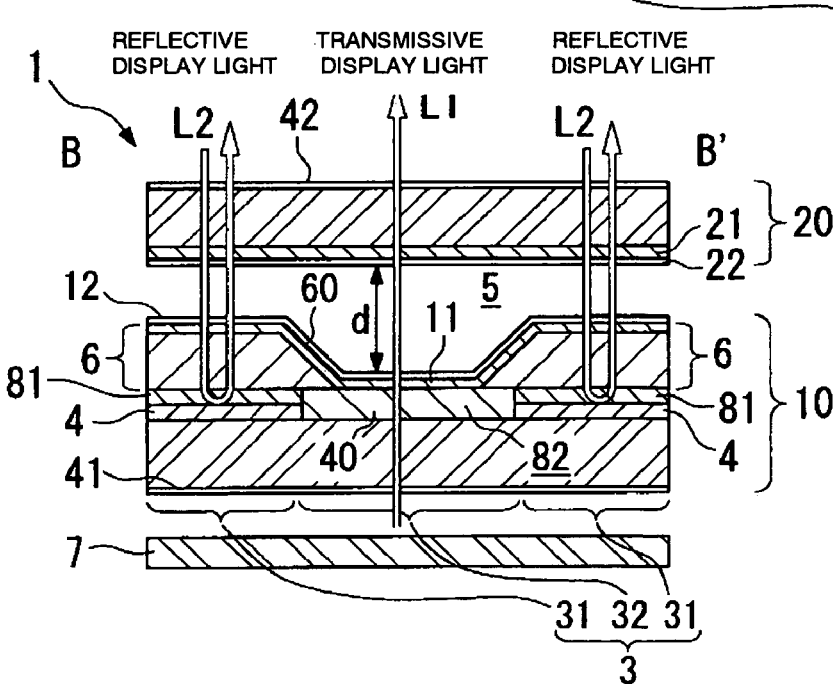

FIG. 20 shows a portable telephone as another embodiment of an electronic device according to the present invention. The illustrated portable telephone 590 comprises a plurality of operation buttons 591 and a display portion including any one of the liquid crystal devices 1, 100, and 200 to which the present invention has been applied.

As is evident from the foregoing, in the transflective liquid crystal device according to present invention, light shielding films are each formed so as to be superimposed over the entire boundary region of the reflective display region and the transmissive display region. As a result, even when the thickness of each of the layer-thickness adjusting layers continuously varies in the boundary region of the reflective display region 31 and the transmissive display region 32, and consequently the retardation $\Delta n \cdot d$ continuously varies in this portion, or the alignment of liquid crystal molecules is disturbed, neither reflective display light nor transmissive display light would be emitted from such a region. This prevents a malfunction such as a light leakage during black display, resulting in an achievement of high-contrast and high-quality display.

What is claimed is:

1. A transflective liquid crystal device, comprising:
   a first substrate with first transparent electrodes formed on a surface of the first substrate;
   a second substrate with second transparent electrodes formed on a surface of the second substrate opposed to said first electrodes;
   a liquid crystal layer disposed between said first and second substrates; and
   said first substrate including light reflecting layers each of which constitutes a reflective display region in one pixel region where said first transparent electrodes and said second transparent electrodes are mutually opposed and each of which defines a remaining region of each of said pixel regions as a transmissive display region, layer-thickness adjusting layers each making a layer thickness of said liquid crystal layer in said reflective display region less than a layer thickness of said liquid crystal layer in said transmissive display region, and said first transparent electrodes, stacked in this order from a lower layer side to an upper layer side, wherein a light shielding film is formed over the first substrate so as to be superimposed on a boundary region of said reflective display region and said transmissive display region.

2. A transflective liquid crystal device according to claim 1, wherein said light shielding film is formed on a side of said first transparent substrate.

3. A transflective liquid crystal device according to claim 1, wherein each of said layer-thickness adjusting layers is arranged so that the boundary region of said reflective display region and said transmissive display region constitutes an inclined surface.

4. A transflective liquid crystal device according to claim 3, wherein said light shielding film is formed in a region where said light shielding film is two-dimensionally superimposed on said inclined surface of said layer-thickness adjusting layers.

5. A transflective liquid crystal device according to claim 1, wherein said light shielding film is formed so as to be two-dimensionally superimposed on an edge portion of said light reflecting layer.

6. A transflective liquid crystal device according to claim 1, wherein each of said transmissive display regions is disposed at an end portion of said pixel region.

7. A transflective liquid crystal device according to claim 6, wherein each of said pixel regions is formed as a rectangular region, and wherein each of said transmissive display regions has a rectangular shape at least one side of which is superimposed on a side of said pixel region.

8. A transflective liquid crystal device according to claim 7, wherein each of said transmissive display regions is positioned so that one side thereof is superimposed on a side of said pixel region.

9. A transflective liquid crystal device according to claim 7, wherein each of said transmissive display regions is positioned so that two sides thereof are superimposed on sides of said pixel region.

10. A transflective liquid crystal device according to claim 7, wherein each of said transmissive display region is positioned so that three sides thereof are superimposed on sides of said pixel region.

11. A transflective liquid crystal device according to claim 10, wherein a wiring line that blocks light so as to divide said pixel region into two, runs as said light shielding film, and wherein each of said reflective display regions and one of said transmissive display regions are disposed on respective opposite sides of said wiring line.

12. A transflective liquid crystal device according to claim 1, wherein said reflective display regions and said transmissive display regions are individually provided with a color filter.

13. A transflective liquid crystal device according to claim 1, wherein a reflective display color filter is formed in each of said reflective display regions, while a transmissive display color filter having a coloring degree higher than that of said reflective display region color filter, is formed in each of said transmissive display regions.

14. A transflective liquid crystal device according to claim 1, wherein said reflective display region and said transmissive display region are essentially equal in area.

* * * * *